(12) United States Patent
Gray et al.

(10) Patent No.: US 11,321,172 B1
(45) Date of Patent: *May 3, 2022

(54) VAULT TRANSFORMATION WITHIN A STORAGE NETWORK

(71) Applicant: Pure Storage, Inc., Mountain View, CA (US)

(72) Inventors: Adam M. Gray, Chicago, IL (US); Greg R. Dhuse, Chicago, IL (US); Andrew D. Baptist, Mt. Pleasant, WI (US); Ravi V. Khadiwala, Bartlett, IL (US); Wesley B. Leggette, Chicago, IL (US); Scott M. Horan, Clarendon Hills, IL (US); Franco V. Borich, Naperville, IL (US); Bart R. Cilfone, Marina del Rey, CA (US); Daniel J. Scholl, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/840,196

(22) Filed: Apr. 3, 2020

Related U.S. Application Data

(63) Continuation of application No. 15/844,299, filed on Dec. 15, 2017, now Pat. No. 10,621,042, which is a continuation-in-part of application No. 14/926,891, filed on Oct. 29, 2015, now Pat. No. 10,126,974.

(Continued)

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/065* (2013.01);
(Continued)

(58) Field of Classification Search
CPC .. G06F 11/1076; G06F 3/0607; G06F 3/0619; G06F 3/0631; G06F 3/064; G06F 3/067; G06F 3/065
See application file for complete search history.

(56) References Cited

U.S. PATENT DOCUMENTS 4,092,732 A  5/1978  Ouchi
5,454,101 A  9/1995  Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Mark A Giardino, Jr.
(74) *Attorney, Agent, or Firm* — Garlick & Markison; Timothy W. Markison; Timothy D. Douglas

(57) ABSTRACT

A method includes identifying an existing logical storage vault having existing dispersed storage coding properties for vault transformation, where a first set of storage units support the existing logical storage vault, and a data object of first data objects stored within the first set of storage units is stored as a first plurality of sets of encoded data slices in accordance with the existing dispersed storage coding properties. The method includes identifying a new logical storage vault having new dispersed storage coding properties, wherein storage units support the new logical storage vault. The method includes transforming the first data objects from being in accordance with the existing dispersed storage coding properties to being in accordance with the new dispersed storage coding properties to produce transformed first data objects. The method includes storing the transformed first data objects in the new logical storage vault supported by the storage units.

20 Claims, 20 Drawing Sheets

Related U.S. Application Data

(60) Provisional application No. 62/089,414, filed on Dec. 31, 2014.

(52) U.S. Cl.
CPC ............ *G06F 3/0607* (2013.01); *G06F 3/067* (2013.01); *G06F 3/0619* (2013.01); *G06F 3/0631* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,128,277 | A | 10/2000 | Bruck |
| 6,175,571 | B1 | 1/2001 | Haddock |
| 6,192,472 | B1 | 2/2001 | Garay |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | De La Torre |
| 2002/0062422 | A1 | 5/2002 | Butterworth |
| 2002/0166079 | A1 | 11/2002 | Ulrich |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula, Jr. |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters, III |
| 2009/0094251 | A1 | 4/2009 | Gladwin |
| 2009/0094318 | A1 | 4/2009 | Gladwin |
| 2010/0023524 | A1 | 1/2010 | Gladwin |
| 2012/0054456 | A1* | 3/2012 | Grube ................. G06F 3/0679 711/158 |
| 2012/0117351 | A1 | 5/2012 | Motwani |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

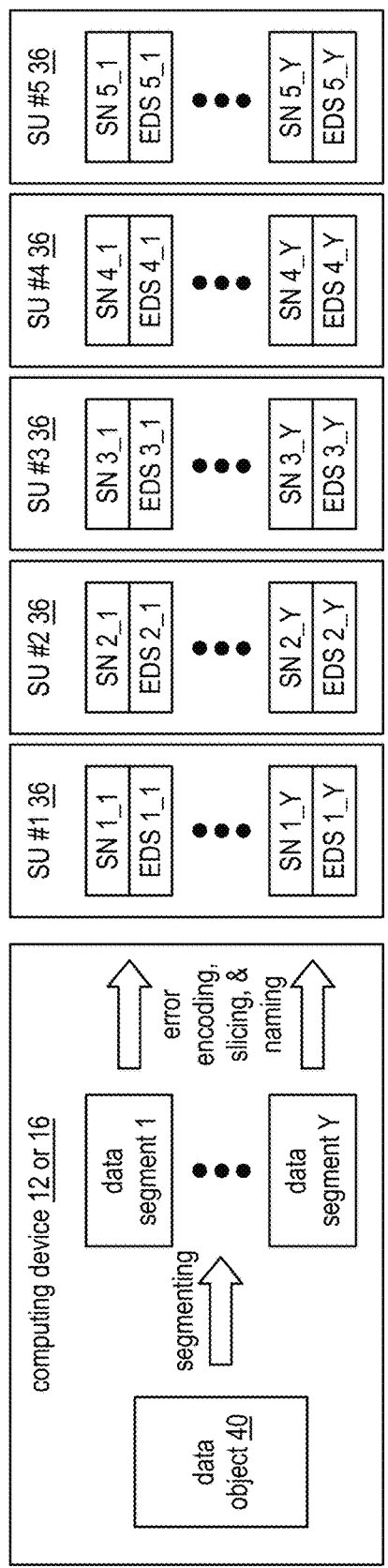
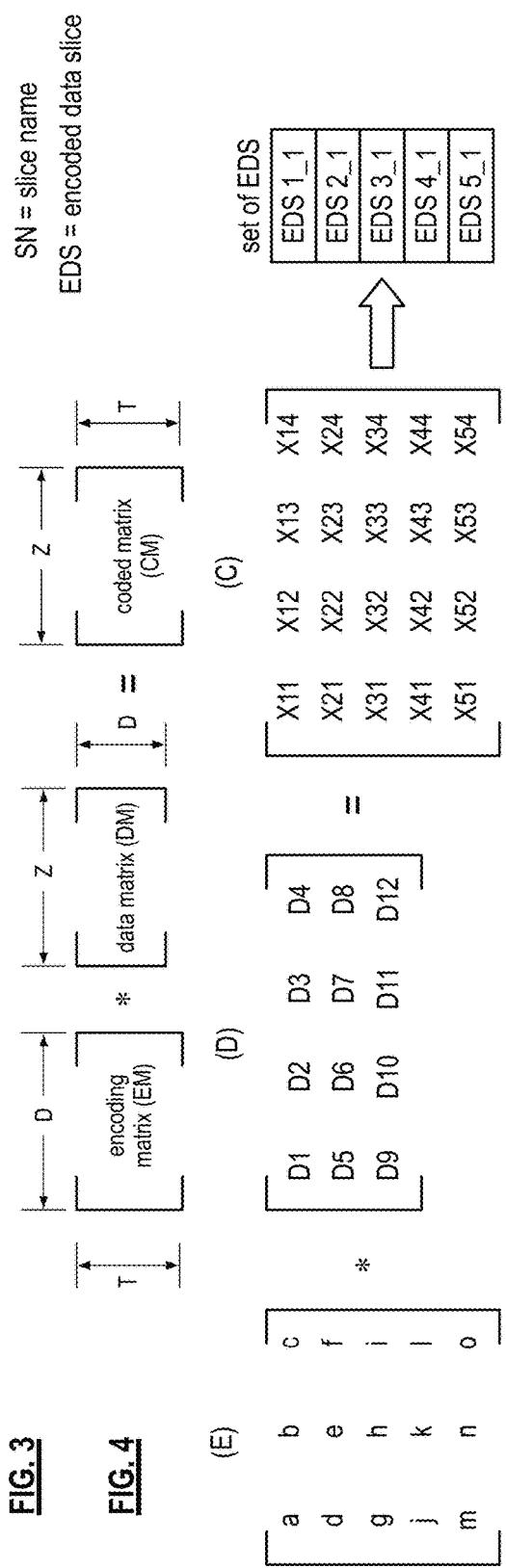
FIG. 3
FIG. 4
FIG. 5
FIG. 6

VAULT TRANSFORMATION WITHIN A STORAGE NETWORK

CROSS-REFERENCE TO RELATED APPLICATIONS

The present U.S. Utility Patent application claims priority pursuant to 35 U.S.C. § 120, as a continuation of U.S. Utility patent application Ser. No. 15/844,299, entitled "VAULT TRANSFORMATION WITHIN A DISPERSED STORAGE NETWORK," filed Dec. 15, 2017, issuing on Apr. 14, 2020 as U.S. Pat. No. 10,621,042, which is a continuation-in-part (CIP) of U.S. Utility patent application Ser. No. 14/926,891, entitled "REDISTRIBUTING ENCODED DATA SLICES IN A DISPERSED STORAGE NETWORK," filed Oct. 29, 2015, issued on Nov. 13, 2018 as U.S. Pat. No. 10,126,974, which claims priority pursuant to 35 U.S.C. § 119(e) to U.S. Provisional Application No. 62/098,414, entitled "SYNCHRONIZING UTILIZATION OF A PLURALITY OF DISPERSED STORAGE RESOURCES," filed Dec. 31, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

Figure 16B:
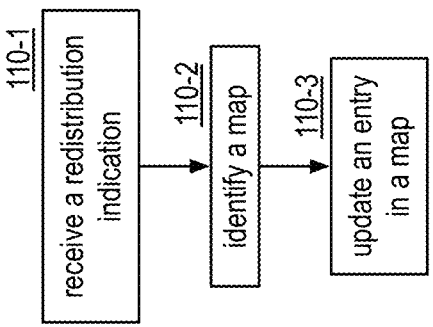
Figure 16C:
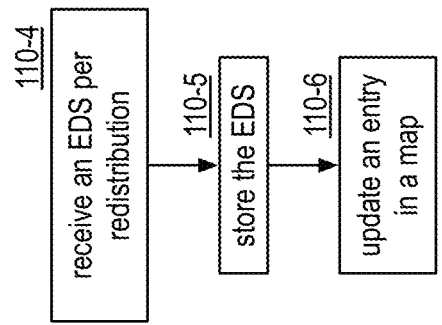
Figure 16A:
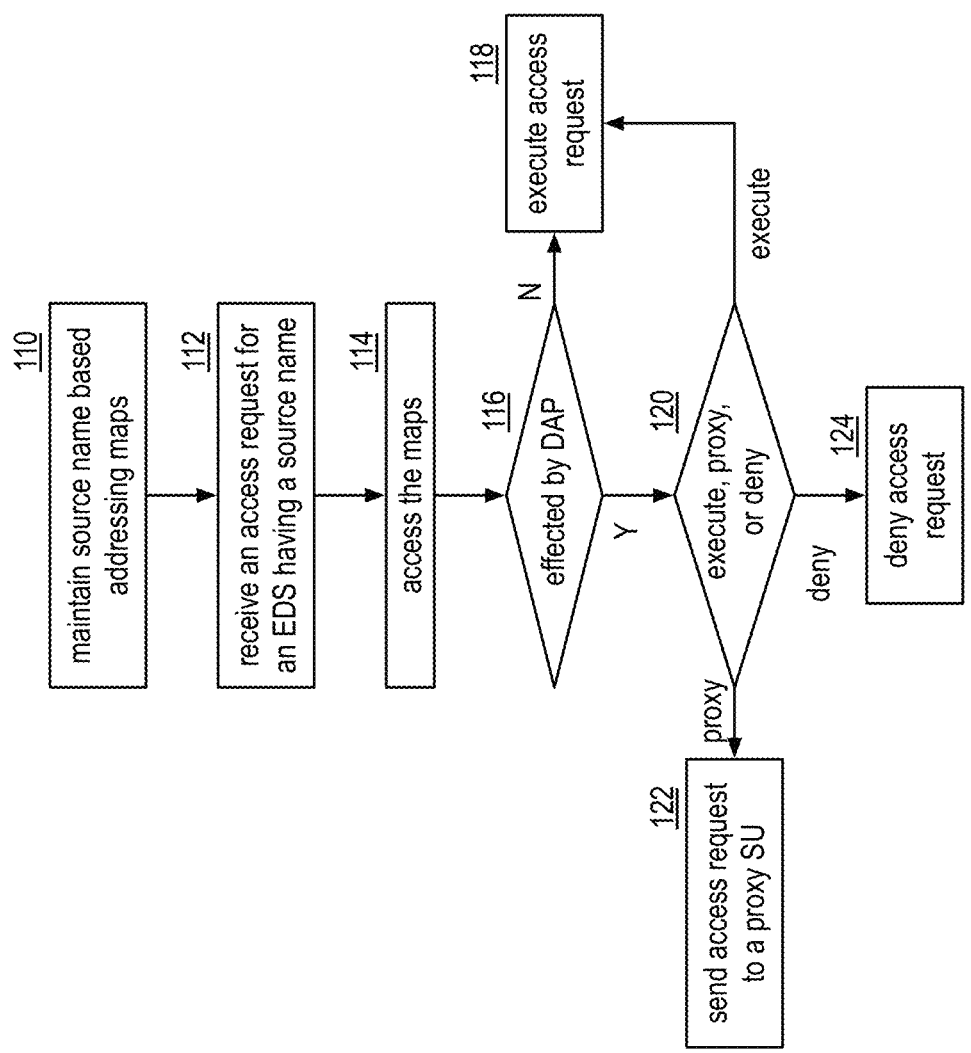
Figure 17:
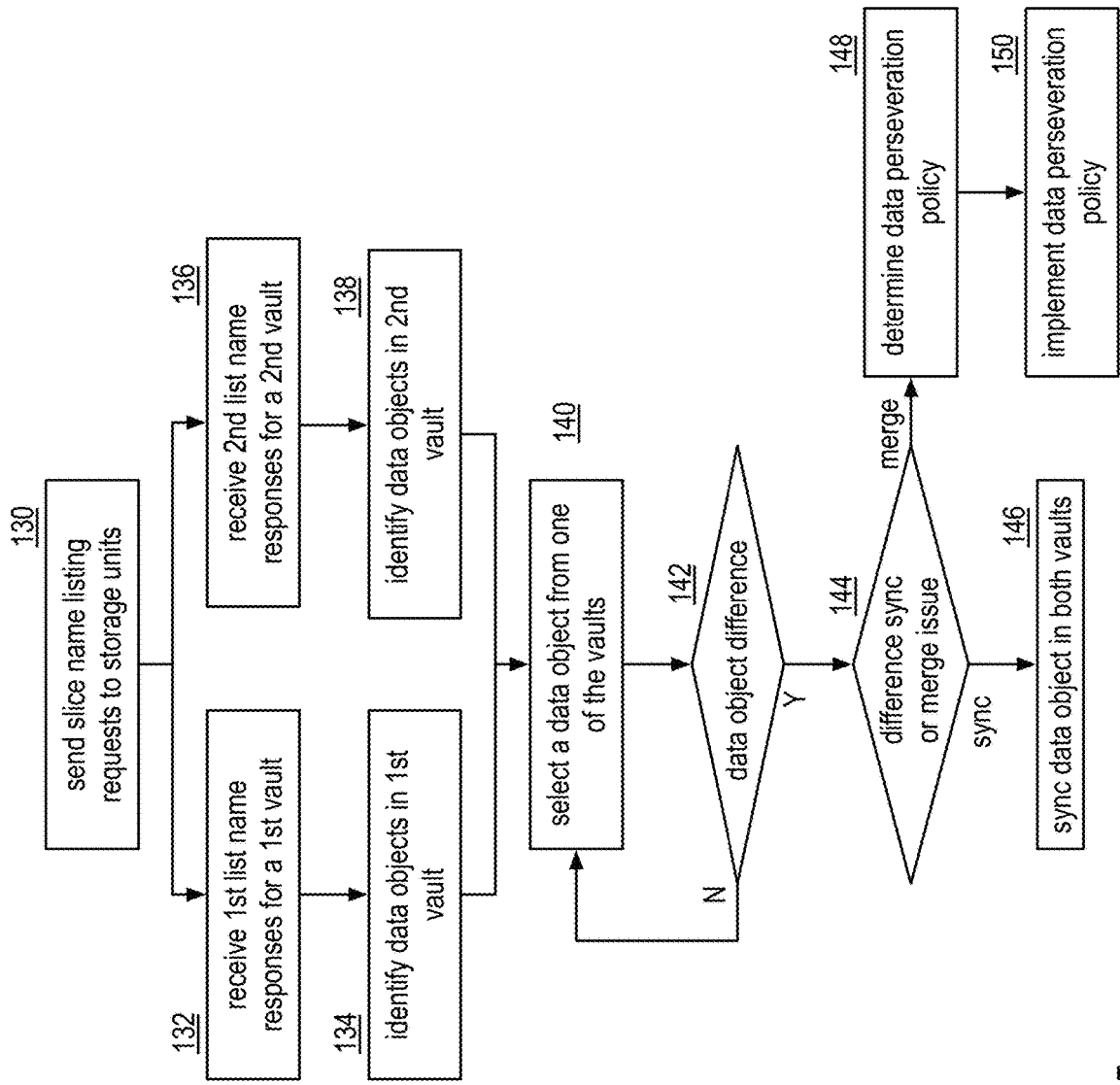
Figure 18:
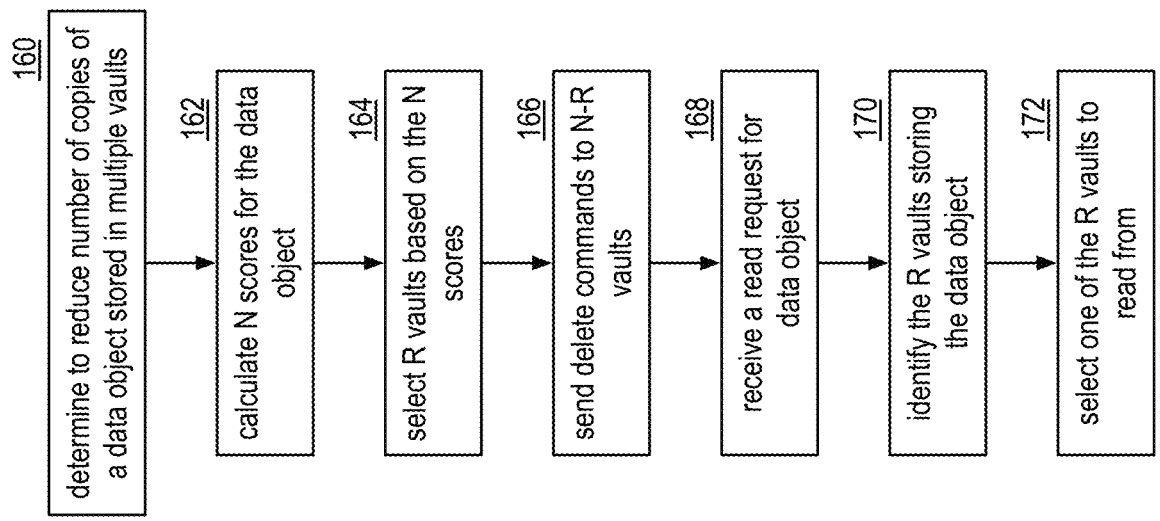
Figure 19A:
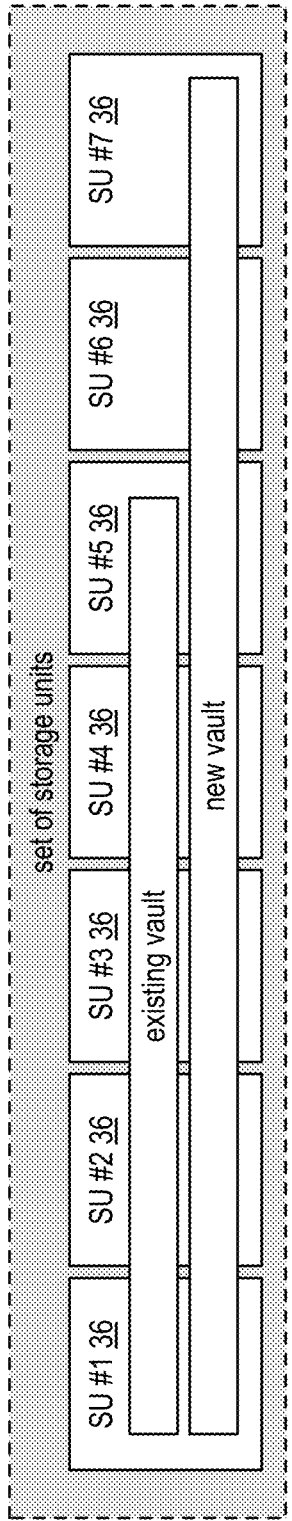
Figure 19B:
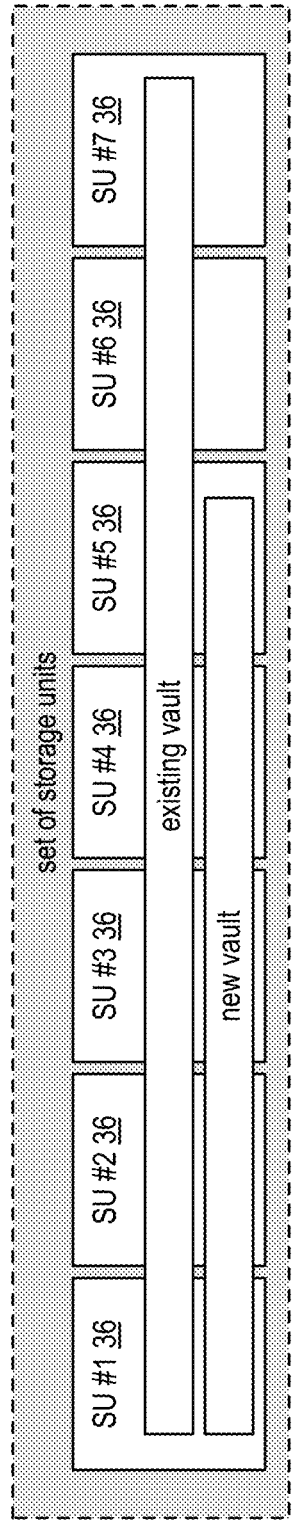
Figure 19C:
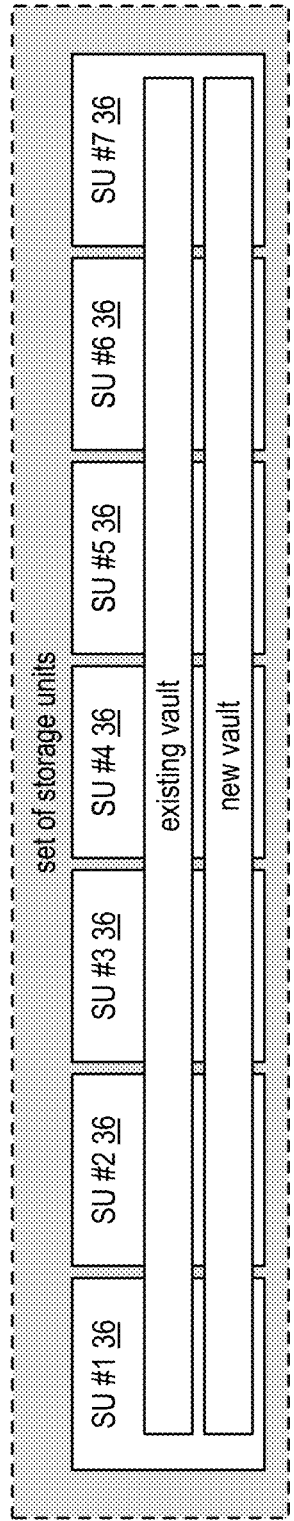
Figure 20:
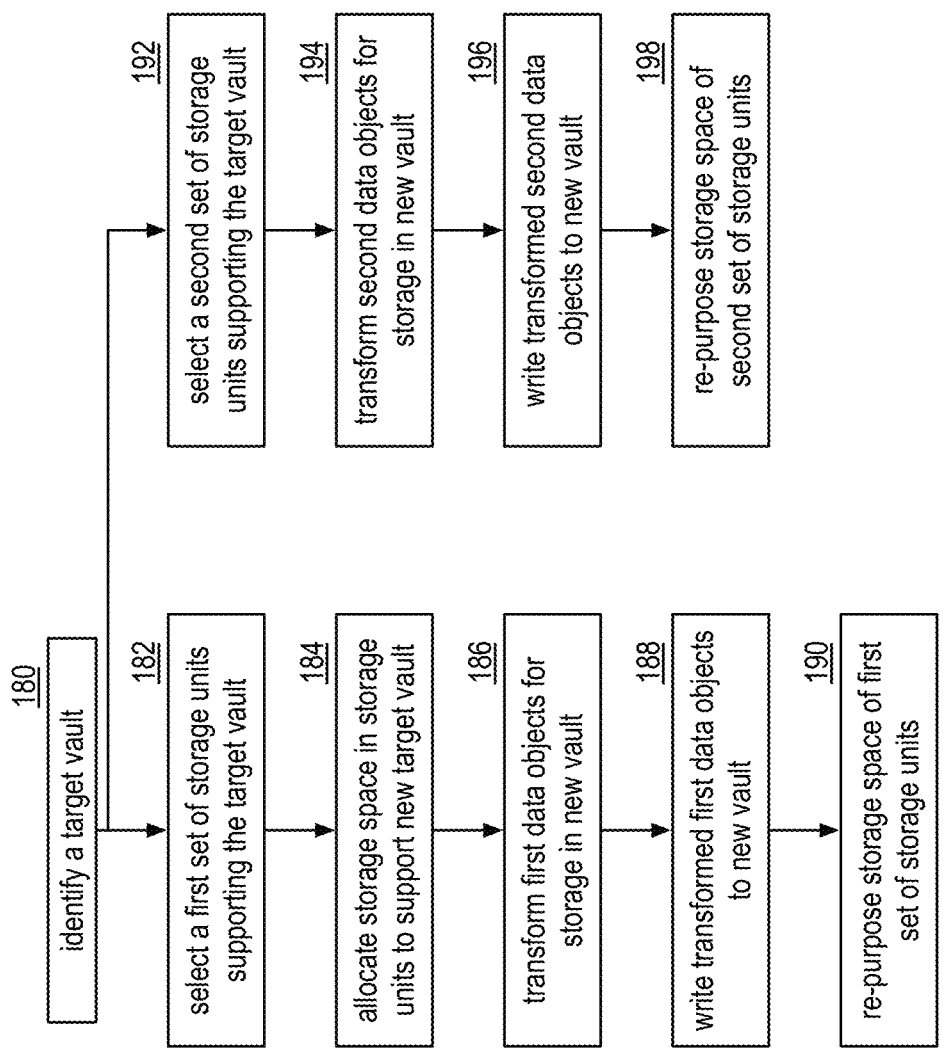

FIGS. 16A-C are logic diagrams of another embodiment of a method for performing a decentralized agreement protocol (DAP) redistribution operation in accordance with the present invention;

FIG. 17 is a logic diagram of another embodiment of a method for performing vault synchronization in accordance with the present invention;

FIG. 18 is a logic diagram of another embodiment of a method for performing vault redundancy reduction in accordance with the present invention;

FIGS. 19A-C are schematic block diagrams of another embodiment of vaults within a DSN in accordance with the present invention; and FIG. 20 is a logic diagram of another embodiment of a method for performing vault transformation in accordance with the present invention.

DETAILED DESCRIPTION OF THE INVENTION

Figure 1:
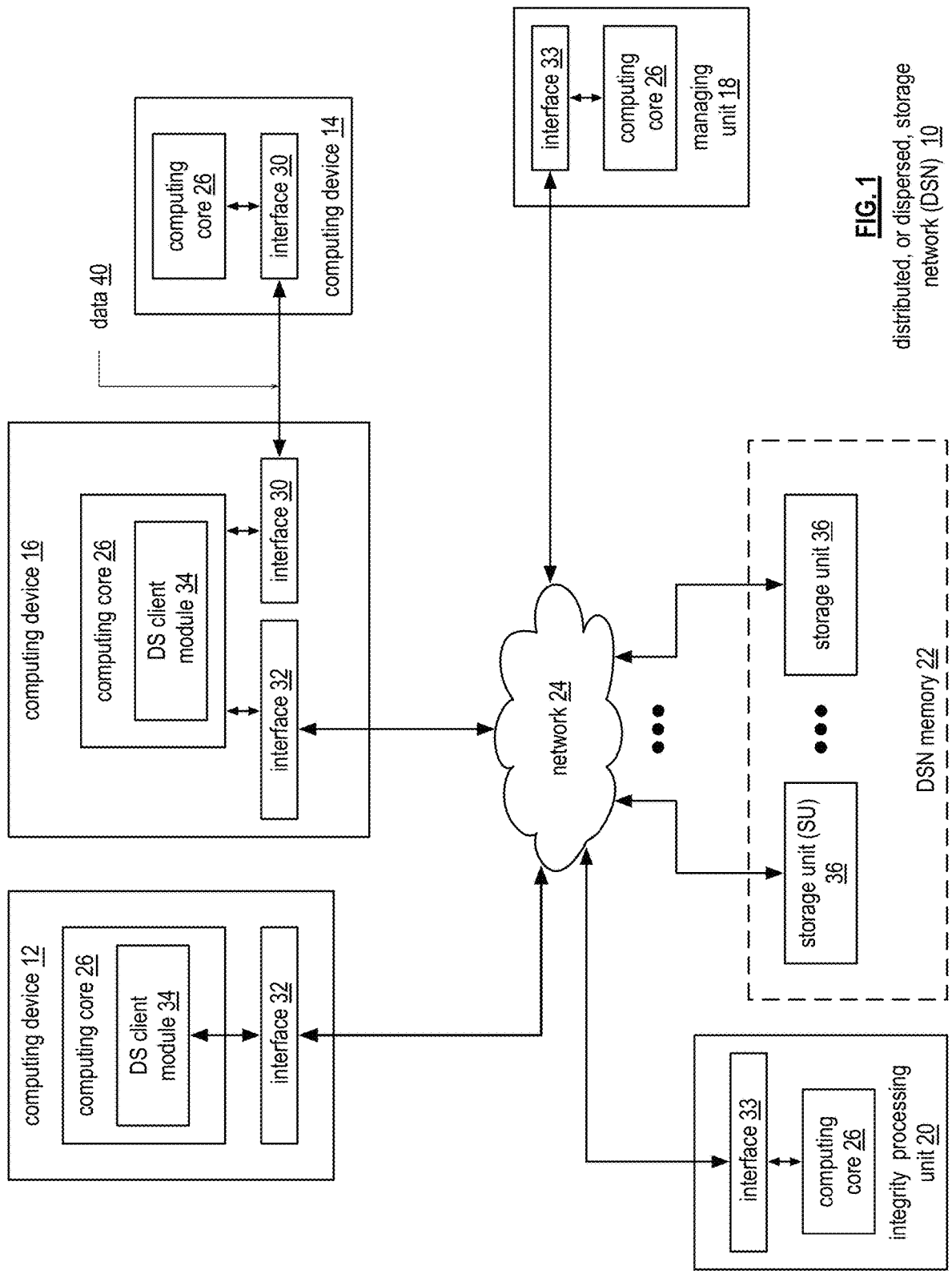
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
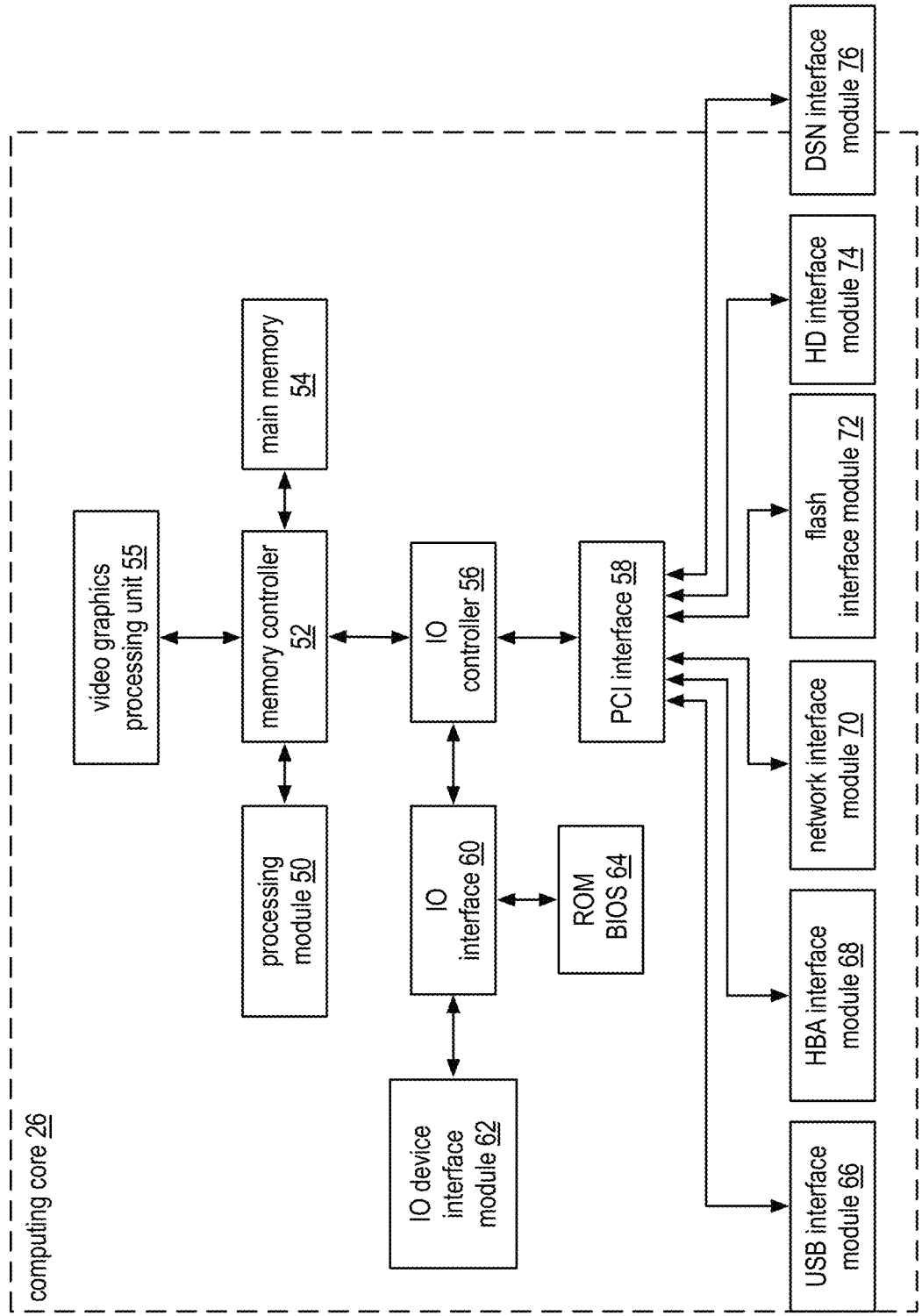
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
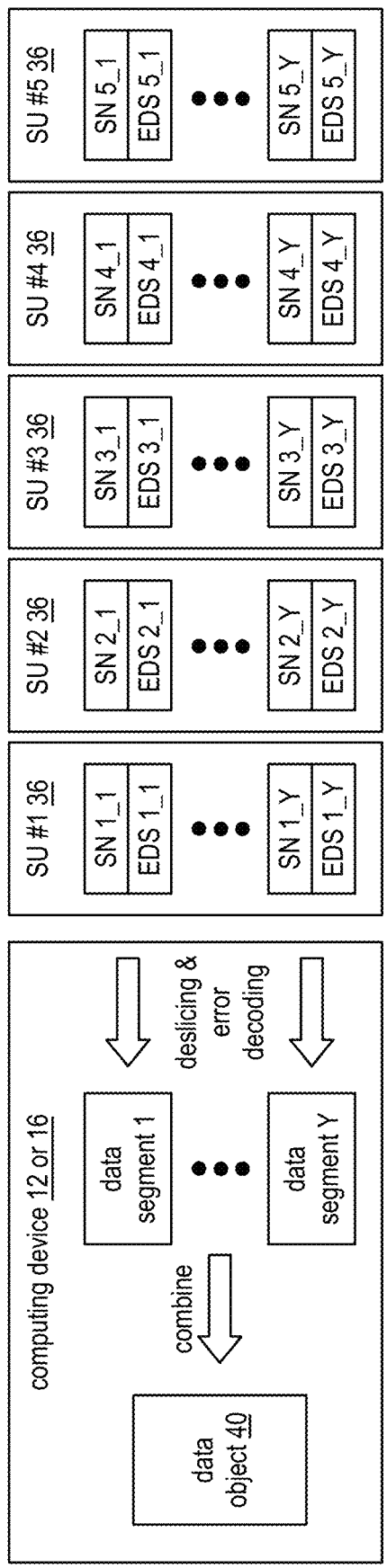
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
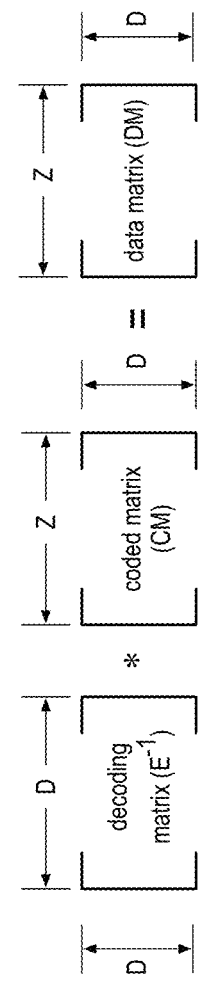
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
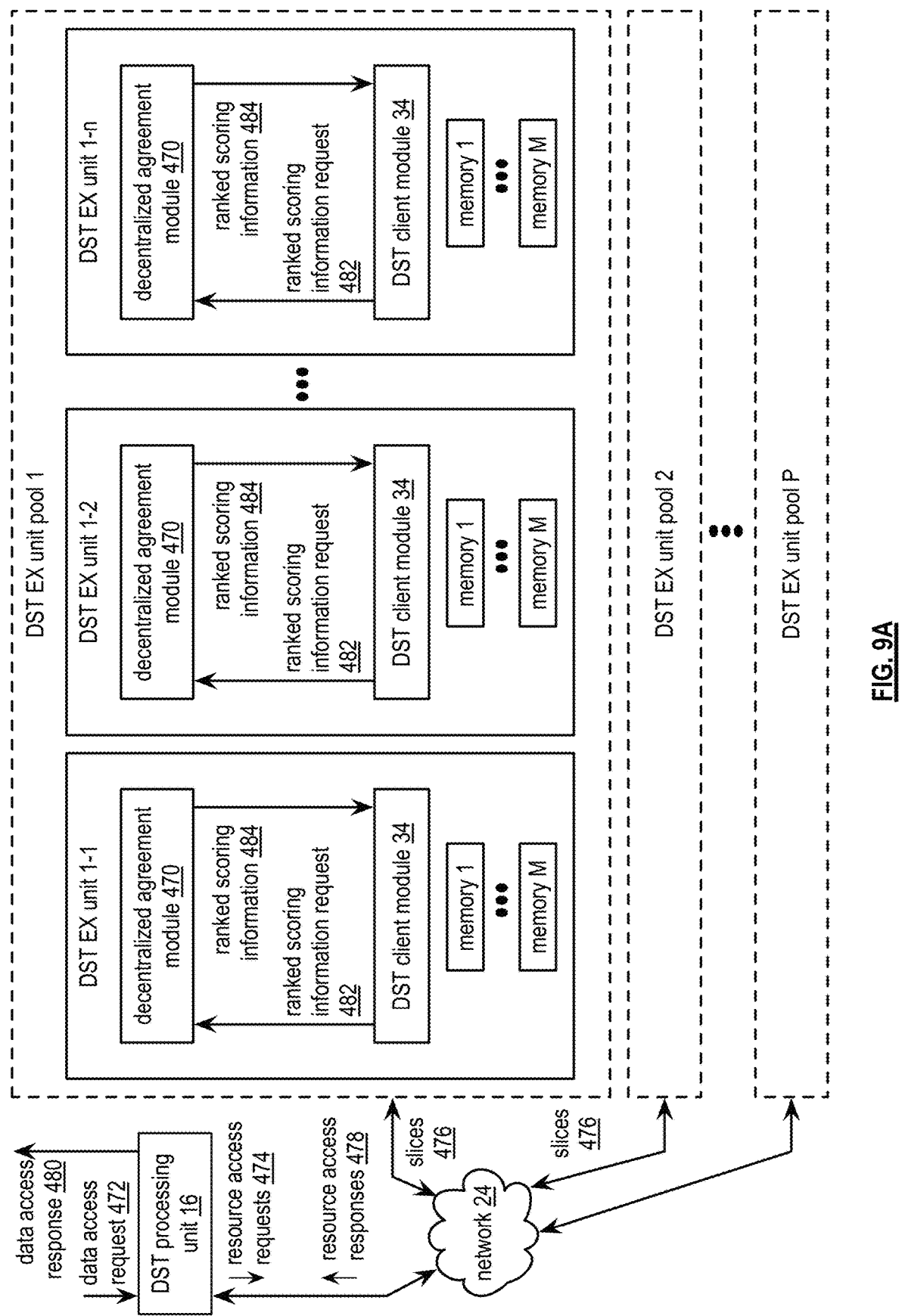
FIG. 9A is a schematic block diagram of an embodiment of a DSN operational to perform a decentralized agreement protocol (DAP) redistribution operation in accordance with the present invention.

FIG. 9A is a schematic block diagram of an embodiment of a DSN operational to perform a decentralized agreement protocol (DAP) redistribution operation. The DSN is shown to include the network 24, a plurality of distributed storage and task (DST) execution (EX) unit pools 1-P, and the DST processing unit 16 (e.g., storage units). Each DST execution unit pool includes a set of DST execution units 1-n. For example, a first DST execution unit pool includes DST execution units 1-1 through 1-n. Each DST execution unit may be implemented utilizing the DST execution unit 36 of FIG. 1 and includes a plurality of memories 1-M, a decentralized agreement module 470, and the DST client module 34 of FIG. 1. The decentralized agreement module 470 may be implemented utilizing the decentralized agreement module. Each memory of the plurality of memories 1-M may be implemented utilizing the memory a computing core. The DSN functions to access encoded data slices during redistribution of the encoded data slices between at least two of the DST execution unit pools in accordance with a redistribution scheme.

In an example of operation of the accessing of the encoded data slices, the DST processing unit 16 receives a data access request 472 from a requesting entity (e.g., a store data request, a retrieve data request). The DST processing unit 16 generates one or more resource access requests 474 (e.g., read slice request, write slice request) based on the data access request. The DST processing unit 16 selects a DST execution unit pool of the plurality of DST execution unit pools based on one or more of interpreting a portion of a DSN address-to-DST execution unit pool table, interpreting a storage resource map, interpreting system registry information, and extracting a DST execution unit pool identifier from the data access request. For example, the DST processing unit selects DST execution unit pool 2 based on interpreting the storage resource map when the redistribution of the encoded data slices is actively redistributing the encoded data slices from DST execution unit pool 1 to the DST execution unit pool 2.

A DST execution unit of the selected DST execution unit pool receives a corresponding resource access request 474 from the DST processing unit 16, where the resource access request 474 includes a slice name. For example, DST execution unit 2 of DST execution unit pool 2 receives a read slice request that includes the slice name. When an encoded data slice 476 associated with the slice name is not locally stored in a memory of the DST execution unit, a DST client module 34 of the DST execution unit identifies at least one other DST execution unit pool associated with the slice name. The identifying may include one or more of interpreting the storage resource map, interpreting the system registry information, and interpreting a received request. For example, the DST client module 34 of the DST execution unit 2 of the DST execution unit pool 2 identifies DST execution unit pools 1, 2, and 3 being associated with the slice name based on the interpreting of the storage resource map.

For each of the at least one other DST execution unit pools, the DST client module 34 issues a ranked scoring information request 482 to a corresponding decentralized agreement module 470 utilizing the slice name (e.g., as an asset identifier) and a storage pool weight associated with the other DST execution unit pool. For example, the DST client module 34 of the DST execution unit 2 of the DST execution unit pool 2 obtains storage pool weights associated with the DST execution unit pools 1-3 from one or more of a local table, the storage resource map, the system registry information, and a query response.

For each ranked scoring information request 482, the DST client module 34 receives corresponding ranked scoring information 484. For example, the DST client module 34 receives rank scoring information 484 for each of the DST execution unit pools 1-3. Having received the ranked scoring information 484, the DST client module 34 selects at least one other DST execution unit pool based on the rank scoring information 484. The selecting includes at least one of identifying a DST execution unit pool associated with a highest score, a second highest score, and a score above a minimum score threshold level. For example, the DST client module 34 identifies the DST execution unit pool 1 as associated with the second highest score (e.g., since the second highest scores associated with a source of the encoded data slice redistribution and the highest score is associated with a destination of the encoded data slice redistribution).

Having identified the other DST execution unit pool, the DST client module 34 facilitates obtaining the encoded data slice 476 from the other DST execution unit pool. For example, the DST client module 34 of the DST execution unit 2 of the DST execution unit pool 2 issues, via the network 24, a read slice request to the DST execution unit 2 of the DST execution unit pool 1 to retrieve the encoded data slice 476 and receives a read slice response that includes the encoded data slice 476. Having obtained the encoded data slice 476, the DST client module 34 issues, via the network 24, a resource access response 478 to the DST processing unit 16, where the resource access response includes the encoded data slice 476 (e.g., proxied access). Having received the resource access responses 478, the DST processing unit 16 issues a data access response 480 to the requesting entity based on the received resource access response 478 (e.g., to include decoded data).

Figure 9B:
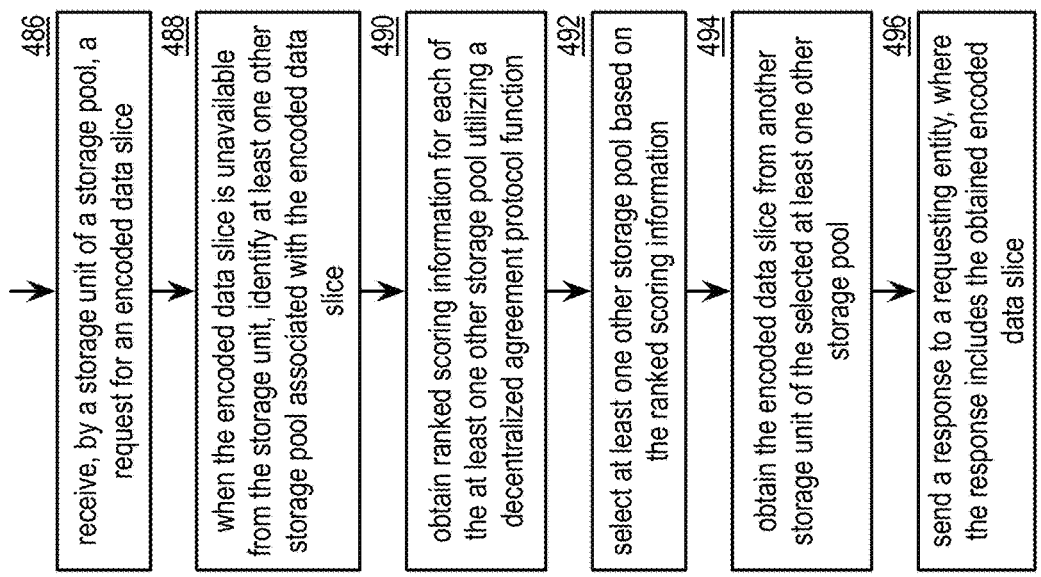
FIG. 9B is a logic diagram of an embodiment of a method for performing a decentralized agreement protocol (DAP) redistribution operation in accordance with the present invention.

FIG. 9B is a logic diagram of an embodiment of a method for performing a decentralized agreement protocol (DAP) redistribution operation. The method includes step 486 where a processing module (e.g., of a storage unit of a storage unit pool) receives a request for an encoded data slice. For example, the processing module interprets a read slice request from a requesting entity to produce a slice name for the encoded data slice.

When the encoded data slices unavailable from the storage unit, the method continues at step 488 where the processing module identifies at least one other storage unit pool associated with the encoded data slice. For example, the processing module interprets a slice name list to determine that the encoded data slice is unavailable and identifies the at least one other storage unit pool based on one or more of interpreting a storage resource map, interpreting system registry information, interpreting a request, and interpreting a received message indicating a previous storage unit pool affiliation.

The method continues at step 490 where the processing module obtains ranked scoring information for each of the at least one other storage unit pool utilizing a decentralized agreement protocol function. For example, the processing module applies a distributed agreement protocol function to the slice name utilizing a weight of the storage unit pool to produce the ranked scoring information indicating a ranking of storage unit pools that may have previously or are currently storing the encoded data slice.

The method continues at step 492 where the processing module selects at least one other storage unit pool based on the ranked scoring information. For example, the processing module selects a storage unit pool associated with a highest ranked score. The method continues at step 494 where the processing module obtains the encoded data slice from another storage unit of the selected at least one other storage unit pool. For example, the processing module selects a storage unit affiliated with the encoded data slice (e.g., based on a slice name to storage unit assignment table), issues a read slice request to the other storage unit, where the read slice request includes a slice name of the encoded data slice, and receives a read slice response that includes the encoded data slice. Alternatively, or in addition to, the other storage unit may obtain the encoded data slice from yet another storage unit in a similar fashion.

The method continues at step 496 where the processing module sends a response to a requesting entity, where the response includes the obtained encoded data slice. For example, the processing module issues a read slice response to the requesting entity, where the read slice response includes the encoded data slice.

Alternatively, or in addition to, when writing an encoded data slice, the processing module receives a write slice request and/or a check write slice request, determines that another storage unit pool was previously responsible for this encoded data slice, determines that a redistribution is in progress that includes a slice name of the received encoded data slice, determines that the redistribution has not yet process the slice name, and forwards the write slice requests to the other storage unit pool to temporarily store the encoded data slice in the other storage unit pool.

Figure 10A:
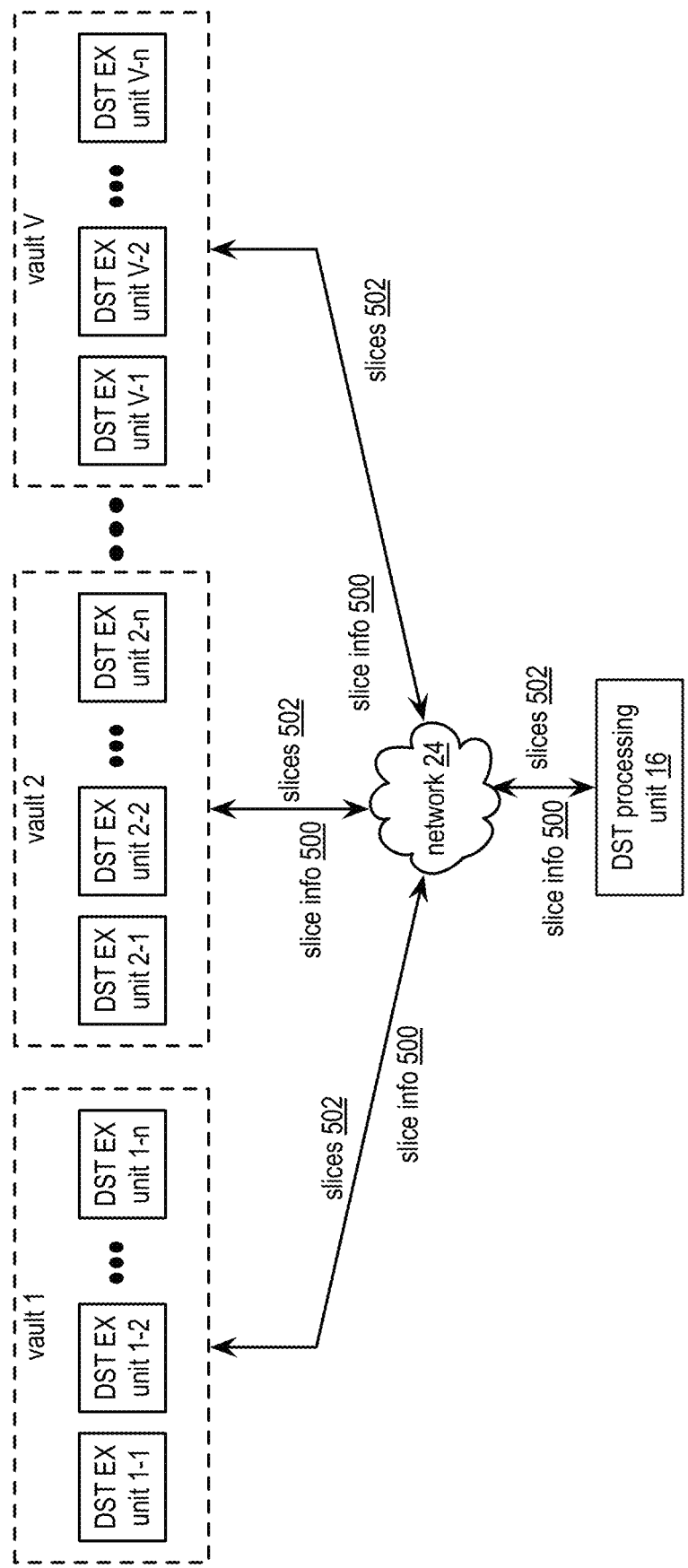
FIG. 10A is a schematic block diagram of an embodiment of a DSN operational to perform vault synchronization in accordance with the present invention.

FIG. 10A is a schematic block diagram of an embodiment of a DSN operational to perform vault synchronization. The DSN is shown to include a plurality of storage vaults 1-V, the network, and the distributed storage and task (DST) processing unit 16 (e.g., storage units). Each storage vault includes a set of n DST execution units. For example, the storage vault 1 includes DST execution units 1-1 through 1-$n$ and the storage vault 2 includes DST execution units 2-1 through 1-$n$. Alternatively, the plurality of storage vaults may be implemented virtually within a single common set of DST execution units. Further alternatively, functionality of the DST processing unit 16 may be implemented with a synchronizing agent, where the synchronizing agent is implemented utilizing a processing module of any one or more of the DST execution units and/or two or more DST processing units 16.

The DSN functions to synchronize storage of data across the plurality of storage vaults. In an example of operation of the synchronizing of the storage of the data, the DST processing unit 16 identifies encoded data slices stored in the plurality of storage vaults for at least a portion of a DSN address range corresponding to slice names of the identified encoded data slices. The identifying includes identifying encoded data slices of stored data and/or identifying metadata encoded data slices of metadata associated with the store data. Such metadata may include one or more of a DSN address (e.g., a slice name, a portion of the slice names such as a source name, where a source name includes a vault identifier and a unique object number) associated with storage of encoded data slices of the data, a data size indicator, a data type indicator, and a data owner identifier (ID). For example, the DST processing unit 16 exchanges, via the network 24, slice information 500 with some of the storage vaults to identify the encoded data slices. The slice information 500 includes one or more of a list slice request, a list slice response, a slice name, a slice revision number, an object revision number, the delete slice request, and a delete slice response.

Having identified the encoded data slices, the DST processing unit 16 determines its revisions of each data object stored in the plurality of storage vaults for the DSN address range based on the identified encoded data slices. For example, the DST processing unit 16 indicates a revision of a data object when a threshold number of encoded data slices are stored in a vault for a common revision of a data object. The threshold number includes at least one of a write threshold number, a read threshold number, and a decode threshold number. The common revision of the data object may be indicated by at least one of an object revision number, a slice revision number, a timestamp, and a size indicator.

Having determined stored revisions of each data object, the DST processing unit 16 detects at least one storage vault of the plurality of storage vaults that includes a different stored revision of a data object compared to one or more other storage vaults. For example, the DST processing unit 16 indicates the difference when a comparison of revisions of each data object across the plurality of storage vaults indicates a different revision for a given data object.

Having detected the difference, the DST processing unit 16 identifies a desired one or more revisions of the data object to be stored in each of the plurality of storage vaults. The identifying includes choosing in accordance with one or more of a predetermination, an interpretation of a system registry, a storage policy, an interpretation of metadata corresponding to the data object, and an interpretation of a request. For example, the DST processing unit 16 identifies all revisions when versioning is enabled as indicated by a metadata associated with the data object. As another example, the DST processing unit 16 identifies a latest revision based on a revision number or a latest timestamp, when versioning is disabled.

Having identified the desired one or more revisions of the data object, the DST processing unit 16 facilitate storage of the desired one or more revisions of the data object in each of the plurality of storage vaults. For example, the DST processing unit 16 recovers, via the network 24, encoded data slices 502 from a storage vault associated with storage of the data object and stores, via the network 24, and the encoded data slices 502 to the other storage vaults. As another example, the DST processing unit recovers, via the network 24, the encoded data slices 502 from the storage vault associated with storage of the data object, dispersed storage error decodes the recovered encoded data slices 502 to reproduce the data object, dispersed storage error encodes the reproduced data object utilizing dispersal parameters associated with another storage vault to produce new encoded data slices 502, and sends the new encoded data slices 502 to the other storage vault or storage (e.g., re-encoding example).

Figure 10B:
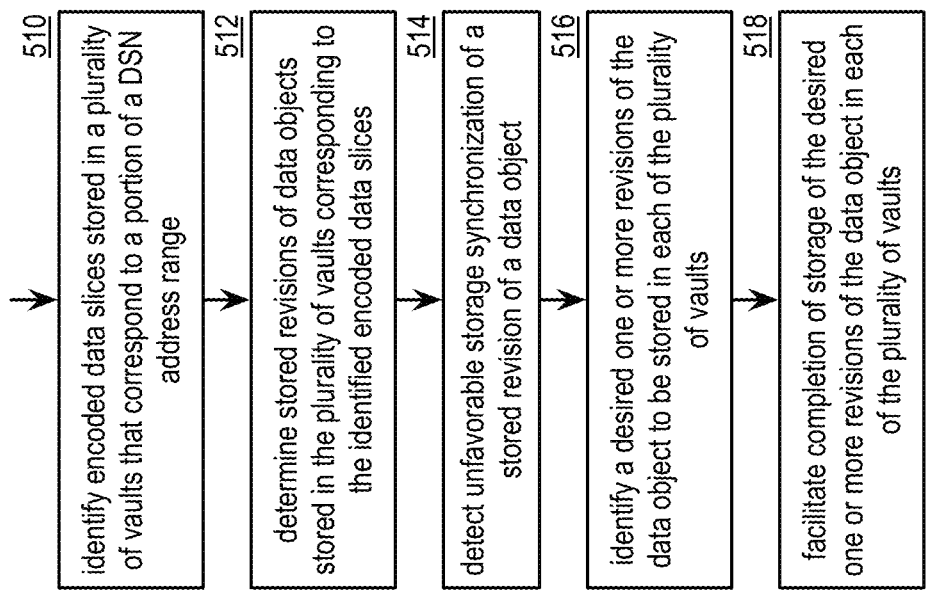
FIG. 10B is a logic diagram of an embodiment of a method for performing vault synchronization in accordance with the present invention.

FIG. 10B is a logic diagram of an embodiment of a method for performing vault synchronization. The method includes step 510 where a processing module (e.g., of a distributed storage and task (DST) processing unit) identifies encoded data slices stored in a plurality of storage vaults that correspond to a portion of a DSN address range. For example, the processing module receives list slice responses to identify the slice names and revisions. As another example, the processing module obtains metadata and extracts timestamps from the metadata.

The method continues at step 512 where the processing module determines stored revisions of data objects stored in the plurality of storage vaults corresponding to the identified encoded data slices. For example, the processing module indicates a revision number corresponding to data objects stored with at least a threshold number of encoded data slices per segment, where the revision number is at least one of a slice revision number, a metadata interpreted data object revision number, a metadata interpreted data size indicator, and a timestamp.

The method continues at step 514 where the processing module detects unfavorable storage synchronization of a stored revision of a data object. For example, the processing module indicates unfavorable when any difference in storage revisions exists (e.g., including a missing revision in one storage vault, and no revisions in another storage vault).

The method continues at step 516 where the processing module identifies a desired one or more revisions of the data object to be stored in each of the plurality of storage vaults. The identifying may be based on one or more of a predetermination, interpreting a system registry, interpreting a storage policy, interpreting metadata of a store data object, and interpreting a request.

The method continues at step 518 where the processing module facilitates completion of storage of the desired one or more revisions of the data object in each of the plurality of storage vaults. For example, the processing module acquires sufficient encoded data slices from a storage vault for a particular revision and produces encoded data slices for storage in at least one other fault when the at least one other vaults requires storage of the particular revision. The facilitating may further include decoding and re-encoding utilizing different dispersal parameters of a dispersed storage error coding function.

Figure 11A:
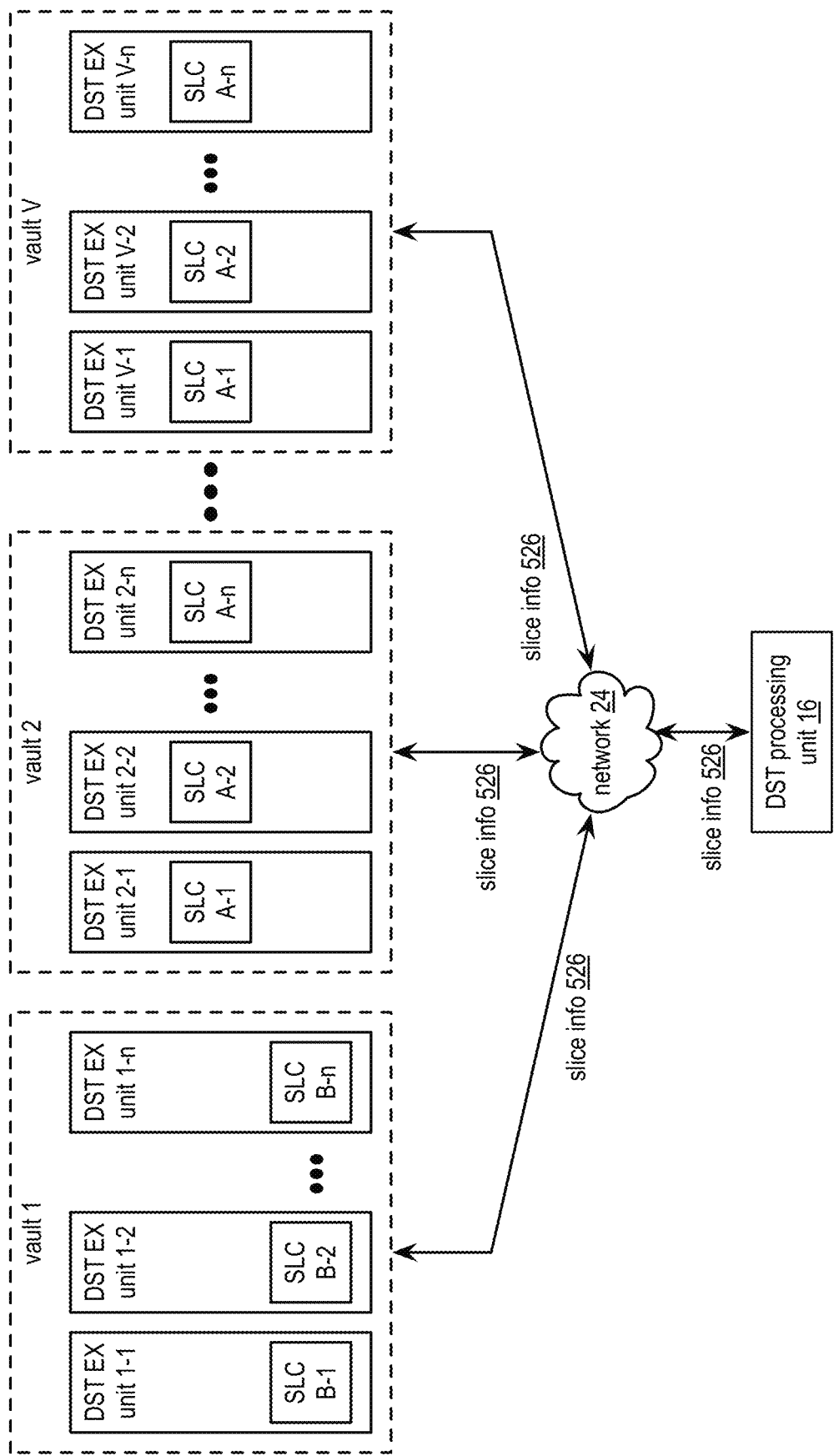
FIG. 11A is a schematic block diagram of an embodiment of a DSN operational to perform vault redundancy reduction in accordance with the present invention.

FIG. 11A is a schematic block diagram of an embodiment of a DSN operational to perform vault redundancy reduction. The DSN is shown to include a plurality of storage vaults 1-V, the network 24, and the distributed storage and task (DST) processing unit 16 (e.g., storage units). Each storage vault includes a set of n DST execution units. For example, the storage vault 1 includes DST execution units 1-1 through 1-n and the storage vault 2 includes DST execution units 2-1 through 2-n. Alternatively, the plurality of storage vaults may be implemented virtually within a single common set of DST execution units. Further alternatively, functionality of the DST processing unit 16 may be implemented with a synchronizing agent, where the synchronizing agent is implemented utilizing a processing module of any one or more of the DST execution units and/or two or more DST processing units 16.

The DSN functions to reduce the volume of redundantly stored data amongst the plurality of storage vaults. In an example of operation of the reducing the volume of redundantly stored data, the DST processing unit 16 determines to reduce a number of copies of a data object stored in the plurality of storage vaults. The determining includes one or more of interpreting a request, identifying an unfavorable storage condition, interpreting system registry information, and identifying a change in access frequency of the data object. For example, the DST processing unit 16 receives slice information 526 from at least some of the storage vaults and interprets the slice information 526 to identify the unfavorable storage condition.

Having determined to reduce the number of copies of the data object, the DST processing unit 16 obtains a storage pool weight for each of the plurality of storage vaults. The obtaining includes at least one of interpreting the system registry information, interpreting a predetermination, interpreting a performance level of the storage vault, and interpreting a capacity level of the storage vault.

Having obtained the storage pool weights, the DST processing unit 16 determines a number of copies R of the data object to retain. The determining includes at least one of interpreting the system registry information, interpreting the access frequency of the data object, and interpreting a request.

Having determined the number of copies R of the data object to retain, the DST processing unit 16 obtains ranked scoring information utilizing a decentralized agreement protocol function for the data object for each of the plurality of storage vaults based on the storage pool weight (e.g., request rank scoring information for an identifier of the data object using the storage pool weight and receive the ranked scoring information).

Having obtained the ranked scoring information, the DST processing unit 16 selects a number of faults R to store the R copies of the data object based on the ranked scoring information. For example, the DST processing unit 16 chooses R storage vaults associated with highest scores of the rank scoring information. As another example, the DST processing unit 16 chooses R storage vaults associated with a score greater than a minimum score threshold level.

Having selected storage vaults, the DST processing unit 16 facilitates maintaining of storage of the R copies of the data object in the selected R storage vaults while not storing the data object in remaining storage vaults. For example, the DST processing unit 16 exchanges, via the network 24, slice information with DST execution units of the storage vaults to verify storage of the data object in each of the R storage vaults (e.g., interpreting a list slice responses to verify that at least a threshold number of encoded data slices for each data segment are present) and deletes encoded data slices of the data object from the remaining storage vaults. Alternatively, or in addition to, the DST processing unit 16 may read the data object by selecting any storage vault corresponding to the R highest scores of the ranked scoring information.

Figure 11B:
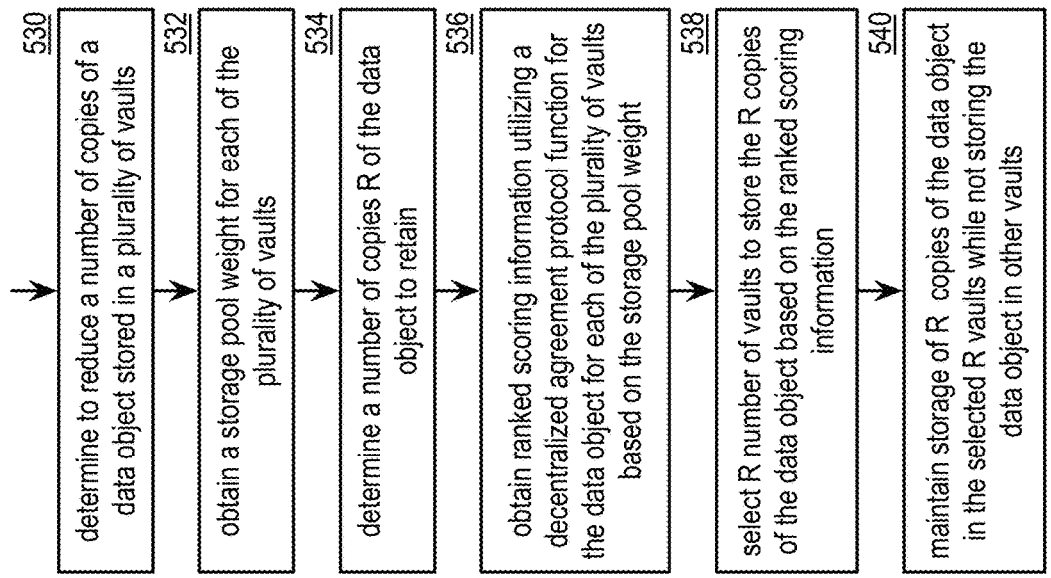
FIG. 11B is a logic diagram of an embodiment of a method for performing vault redundancy reduction in accordance with the present invention.

FIG. 11B is a logic diagram of an embodiment of a method for performing vault redundancy reduction. The method includes step 530 where a processing module (e.g., of a distributed storage and task (DST) processing unit) determines to reduce a number of copies of a data object stored in a plurality of storage vaults. The determining includes at least one of interpreting a request, identifying an unfavorable storage condition, interpreting system registry information, and identifying a change in an access frequency level of the data object. For example, the processing module determines to reduce the number of copies of the data object when the access frequency level has dropped.

The method continues at step 532 where the processing module obtains a storage pool weight for each of the plurality of storage vaults. The obtaining includes at least one of interpreting the system registry information, interpreting a predetermination, interpreting a performance level of the storage vault, and interpreting a capacity level of the storage vault.

The method continues at step 534 where the processing module determines a number of copies R the data object to retain. The determining includes at least one of interpreting the system registry information, interpreting the access frequency level of the data object, and interpreting a request.

The method continues at step 536 where the processing module obtains ranked scoring information utilizing a decentralized agreement protocol function for the data object for each of the plurality of storage vaults based on the storage pool weight. For example, for each vault, the processing module applies the decentralized agreement protocol function on an identifier of the data object utilizing the storage pool weight of the storage vault.

The method continues at step 538 where the processing module selects R number of vaults to store the R copies of the data object based on the ranked scoring information. For example, the processing module selects storage vaults of R highest scores. As another example, the processing module selects any vault with a score greater than a minimum score threshold level.

The method continues at step 540 where the processing module maintains storage of R copies of the data object in the selected R storage vaults while not storing the data object in other storage vaults. For example, the processing module verifies storage in each of the R storage vaults. As another example, the processing module facilitates rebuilding of any missing encoded data slices. As yet another example, the processing module deletes encoded data slices of the data object from storage vaults not included in the selected R storage vaults. Alternatively, or in addition to, the processing module may facilitate reading the data object by selecting any storage vault corresponding to the R highest scores.

Figure 12A:
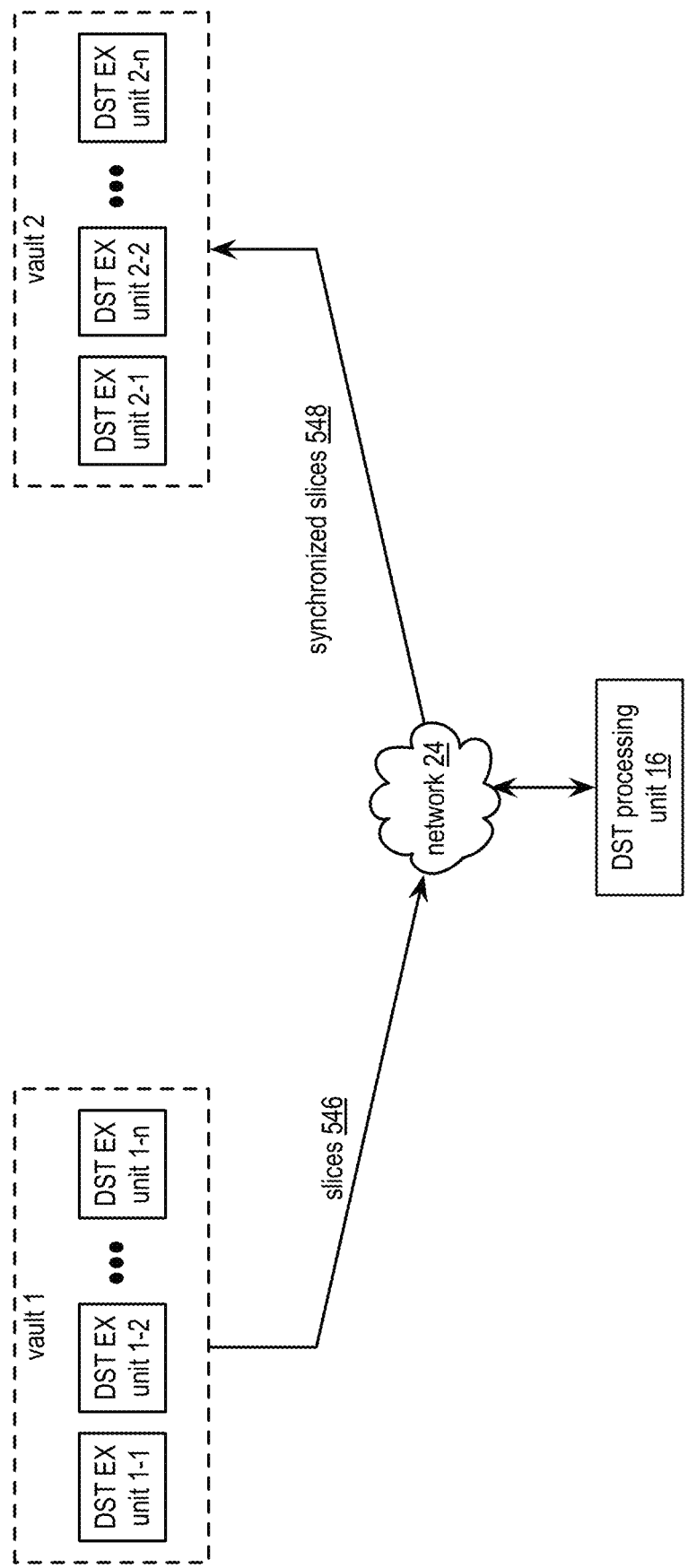
FIG. 12A is a schematic block diagram of an embodiment of a DSN operational to perform vault transformation in accordance with the present invention.

FIG. 12A is a schematic block diagram of an embodiment of a DSN operational to perform vault transformation. The DSN is shown to include at least two storage vaults, the network 24, and the distributed storage and task (DST) processing unit 16 (e.g., storage units). Each storage vault includes a set of n DST execution units. For example, the storage vault 1 includes DST execution units 1-1 through 1-*n* and the storage vault 2 includes DST execution units 2-1 through 1-*n*. Alternatively, the at least two storage vaults may be implemented virtually within a single common set of DST execution units. Further alternatively, functionality of the DST processing unit 16 may be implemented with a synchronizing agent, where the synchronizing agent is implemented utilizing a processing module of any one or more of the DST execution units and/or two or more DST processing units 16.

The DSN functions to move stored data from a source storage vault to one or more destinations storage vaults utilizing a vault synchronization process. For example, the stored data is moved from storage vault 1 to storage vault 2 when storage vault 1 is the source storage vault and storage vault 2 is the destination storage vault. In an example of operation of the moving of the stored data, the DST processing unit 16 determines to transform at least one data object stored as a first plurality of encoded data slices in the first storage vault into a second plurality of encoded data slices stored in the second storage vault. The determining includes at least one of identifying a storage requirement, detecting an end of life condition associated with the first vault, receiving a request, interpreting an error message, and interpreting system registry information.

Having determined to perform the transformation, the DST processing unit 16 selects storage parameters for a multi-vault synchronization process between the first storage vault and at least a second storage vault. For example, the DST processing unit 16 selects the second storage vault (e.g., based on available capacity and a performance level) and selects dispersal parameters. The dispersal parameters include one or more of an information dispersal algorithm (IDA) width, a decode threshold, an encryption algorithm, an encryption key, a dispersed storage error coding function, and a segment size.

Having selected storage parameters, the DST processing unit 16 synchronizes storage of a selected data object of the at least one data object from the first storage vault to the second storage vault utilizing the selected storage parameters. For example, for a portion of a DSN address range corresponding to the selected data object, the DST processing unit 16 receives slices 546 from the first storage vault to recover a data object, re-encodes the recovered data object utilizing the selected storage parameters to produce a synchronized slice 548, and facilitates, via the network 24, storage of the synchronized slices 548 in the at least the second storage vault.

Having synchronized storage of the selected data object, the DST processing unit 16 maintains storage of the selected data object within the at least the second storage vault and not within the first storage vault. The maintaining includes the DST processing unit 16 facilitating the deletion of encoded data slices corresponding to the selected data object from the first storage vault and indicating that to maintain further synchronization for the selected data object. When another data object exists of the at least one data object, the DST processing unit 16 selects the other data object and repeats the multi-vault synchronization process.

Figure 12B:
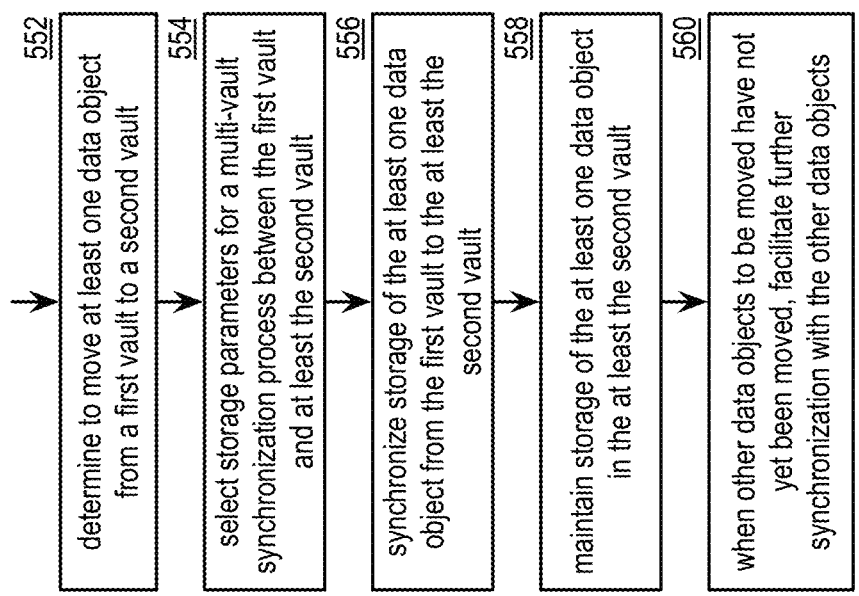
FIG. 12B is a logic diagram of an embodiment of a method for performing vault transformation in accordance with the present invention.

FIG. 12B is a logic diagram of an embodiment of a method for performing vault transformation. The method includes step 552 where a processing module (e.g., of a distributed storage and task (DST) processing unit) determines to move at least one data object from a first storage vault of a second storage vault. The determining includes at least one of interpreting a storage requirement, detecting an end of life condition associated with the first storage vault, interpreting an error message, and interpreting system registry information.

The method continues at step 554 where the processing module selects storage parameters for a multi-vault synchronization process between the first storage vault and at least the second storage vault. For example, the processing module chooses at least the second storage vault as a destination vault and selects dispersal parameters.

The method continues at step 556 where the processing module synchronizes storage of the at least one data object from the first storage vault to the at least the second storage vault. For example, the processing module recovers the at least one data object from the first vault, and, for each other storage vault, the processing module re-encodes the recover data object to produce a plurality of sets of synchronized encoded data slices in accordance with dispersal parameters associated with the other storage vault, and stores the plurality of sets of synchronized encoded data slices in the other storage vault.

The method continues at step 558 where the processing module maintains storage of the at least one data object in the at least the second storage vault. For example, the processing module facilitates deletion of encoded data slices corresponding to the at least one data object from the first storage vault. As another example, the processing module indicates that to maintain further synchronization for the at least one data object.

When other data objects to be moved have not yet been moved, the method continues at step 560 where the processing module facilitates further synchronization with the other data objects. For example, the processing module determines whether another data object is to be moved and/or a further DSN address ranges to be moved, selects a destination vault, selects storage parameters, synchronizes storage from the first storage vault to the destination vault, and maintain storage of the other data object in the destination vault.

Figure 13:
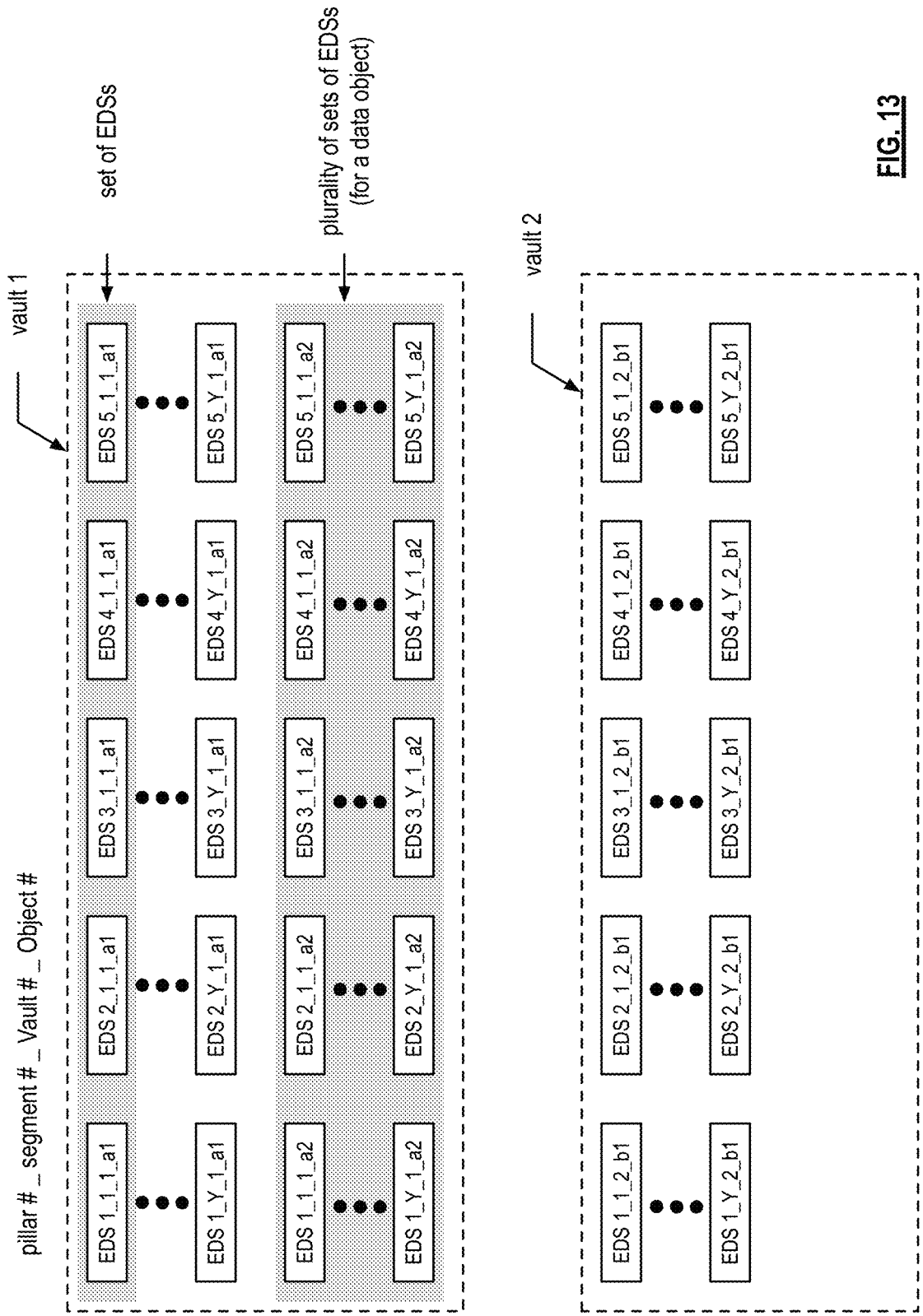
FIG. 13 is a schematic block diagram of an embodiment of vaults within a DSN in accordance with the present invention.

FIG. 13 is a schematic block diagram of an embodiment of vaults within a DSN, wherein, a vault stores pluralities of sets of slices. Each plurality of sets of encoded data slices (EDSs) corresponds to the encoding of a data object, a portion of a data object, or multiple data objects, where a data object is one or more of a file, text, data, digital information, etc. For example, the highlighted plurality of encoded data slices corresponds to a data object having a data identifier of "a2".

Each encoded data slice of each set of encoded data slices is uniquely identified by its slice name, which is also used as at least part of a logical DSN address for storing the encoded data slice. As shown, a set of EDSs includes EDS 1_1_1_a1 through EDS 5_1_1_a1. The EDS number includes pillar number, data segment number, vault ID, and data object ID. Thus, for EDS 1_1_1_a1, it is the first EDS of a first data segment of data object "a1" and is to be stored, or is stored, in vault 1. Note that vaults are logical memory containers supported by the storage units of the DSN. A vault may be allocated to store data for one or more user computing devices.

As is further shown, another plurality of sets of encoded data slices is stored in vault 2 for data object "b1". There are Y sets of EDSs, where Y corresponds to the number of data segments created by segmenting the data object. The last set of EDSs of data object "b_1" includes EDS 1_Y_2_b1 through EDS 5_Y_2_b1. Thus, for EDS 1_Y_2_b1, it is the first EDS of the last data segment "Y" of data object "b1" and is to be stored, or is stored, in vault 2.

Figure 14:
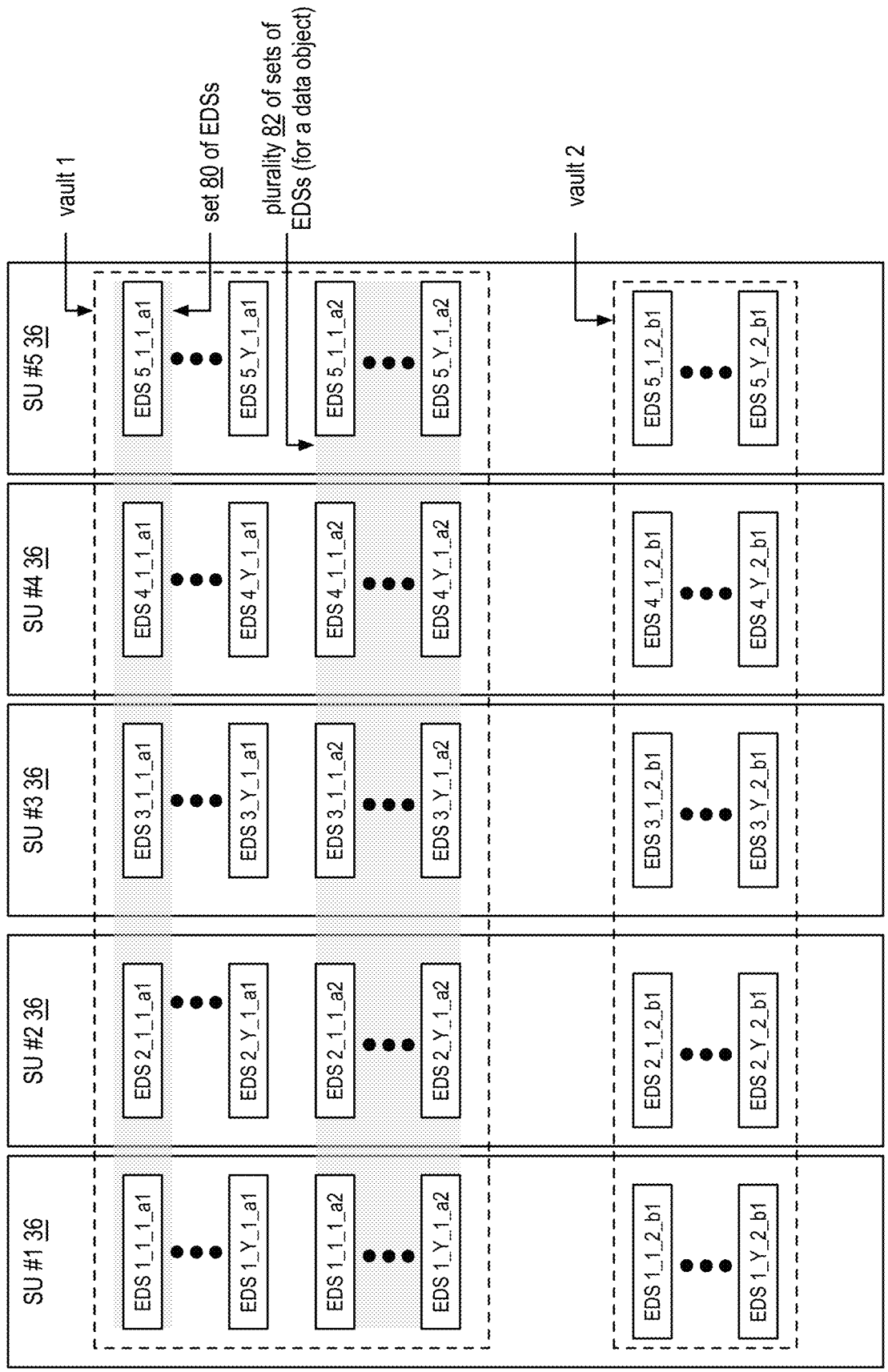
FIG. 14 is a schematic block diagram of another embodiment of vaults within a DSN in accordance with the present invention.

FIG. 14 is a schematic block diagram of another embodiment of vaults within a DSN, wherein, pluralities of sets of slices are stored in a set of storage units (SU) in accordance with the decentralized agreement protocol (DAP). The DAP uses slice identifiers (e.g., the slice name or common elements thereof (e.g., the pillar number, the data segment number, the vault ID, and/or the data object ID)) to identify, for one or more sets of encoded data slices, a set, or pool, of storage units. With respect to the three pluralities of sets of encoded data slices (EDSs) of FIG. 13, the DAP approximately equally distributes the sets of encoded data slices throughout the DSN memory (e.g., among the various storage units).

The first column corresponds to storage units having a designation of SU #1 in their respective storage pool or set of storage units and stores encoded data slices having a pillar number of 1. The second column corresponds to storage units having a designation of SU #2 in their respective storage pool or set of storage units and stores encoded data slices having a pillar number of 2, and so on. Each column of EDSs is divided into one or more groups of EDSs. The delineation of a group of EDSs may correspond to a storage unit, to one or more memory devices within a storage unit, or multiple storage units. Note that the grouping of EDSs allows for bulk addressing, which reduces network traffic.

A range of encoded data slices (EDSs) spans a portion of a group, spans a group, or spans multiple groups. The range may be numerical range of slice names regarding the EDSs, one or more source names (e.g., common aspect shared by multiple slice names), a sequence of slice names, or other slice selection criteria.

Figure 15:
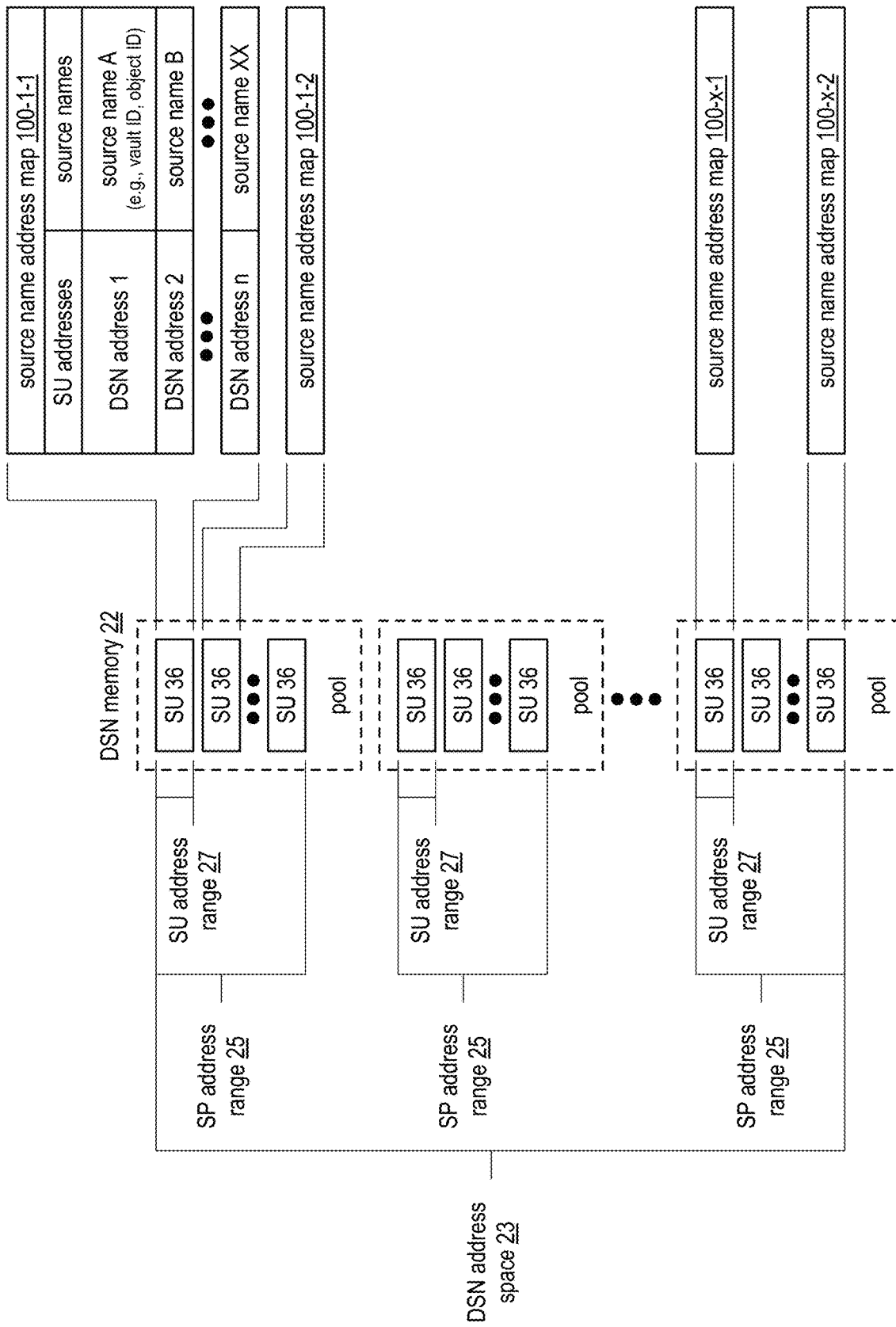
FIG. 15 is a schematic block diagram of an embodiment of DSN address space and source name address mapping within a DSN in accordance with the present invention.

FIG. 15 is a schematic block diagram of an embodiment of DSN address space of the DSN memory 22 and source name address mapping within a DSN. The DSN memory 22 includes a plurality of storage pools. Each storage pool includes a plurality of storage units (SU) 36. The storage units of a storage pool may be arranged as a set of storage units or as a plurality of sets of storage units.

The DSN memory 22 has a logical DSN address space 23, which is addressable by DSN addresses. Depending on the size of the DSN address space 23, a DSN address is 8 bits to over 48 kilobytes. In an embodiment, a DSN address for an encoded data slice being stored in one of the storage units of the DSN memory is a slice name as shown in FIG. 6. Note that the vault ID, the data object ID, and the revision information fields may be collectively referred to as a source name.

The logical DSN address space 23 is divided among the storage pools, such that each storage pool has its own storage pool (SP) address range 25. Within a storage pool, the SP address range 25 is divided among the storage units (SU) within the storage pool, such that each storage unit has its own storage unit (SU) address range. The DAP (i.e., decentralized agreement protocol) functions to generate the DSN addresses for sets of encoded data slices to be stored in the DSN memory 22 in such a manner that the sets of encoded data slices are distributed among the various storage units and/or storage pools of the DSN memory.

When a change occurs within the DSN memory (e.g., add a storage unit, delete a storage unit, upgrade a storage unit's storage capabilities), coefficients of the DAP are changed, which changes the DSN address for some of the stored encoded data slices. When this occurs, the encoded data slices having new DSN addresses need to be transferred from an existing storage unit to a new storage unit.

The transferring of encoded data slices as a result of DAP change should not interrupt normal operations of the DSN (e.g., reading encoded data slices, writing encoded data slices, etc.). As such, the storage units need to keep track of encoded data slices that are being transferred as a result of DAP change such that, if they are involved in a data access request, the request can be generally fulfilled by either the new storage unit (i.e., the storage unit to which the slice is being transferred) or the old storage unit (i.e., the storage unit from which the slice is being transferred).

To facilitate in keeping track of encoded data slices being transferred as a result of a DAP change, each storage unit keeps a plurality of source name address maps 100. A particular source name address map 100-1-1 is for a particular storage unit and includes a listing of source names that are within the address range 25 of the particular storage unit, that are effected by the DAP change, and have not yet been verified that they have been successfully transferred to the new storage unit. The map 100-1-1 also includes, for each source name listed, the corresponding DSN address(es). Note that a storage unit can generate the map by using the DAP and update the map based on input from other storage units of the DSN memory. Further note that a storage unit may keep a map for each of the storage units in the DSN memory, for each of the storage units in its storage pool, or for each of some other combination of storage units of the DSN memory.

FIGS. 16A-C are logic diagrams of another embodiment of a method for performing a decentralized agreement protocol (DAP) redistribution operation by a storage unit of the DSN memory. The method includes step 110 where the storage unit maintains a plurality of source name based addressing maps (e.g., map 100 of FIG. 15). For example, one of the maps includes a listing of source names of the allocated DSN address range of a particular storage unit (e.g., SU address range 27 of FIG. 15). Note that the allocated DSN address range is in accordance with a current version of the decentralized agreement protocol (DAP). The maintaining of the maps includes updating them as will be described with reference to FIGS. 16B and 16C.

The method continues at step 112 where the storage units receives an access request (e.g., a read or a write request) for an encoded data slice having a source name corresponding to a DSN address. Note that, while encoded data slices are being transferred in accordance with a DAP change, access requests are made using the old DAP (i.e., prior to the change) until the transferring of the slices is complete.

The method continues at step 114 where the storage unit accesses the source name based address maps to determine whether the encoded data slice is effected by the DAP redistribution operation. Since the access request is based on the old DAP and the maps are derived from the new DAP, the storage unit can readily determine from the maps whether the encoded data slice is effected by the DAP change (e.g., it is to be transferred from one storage unit to another). For example, the storage unit scans, on a map by map basis, through the source name based addressing maps to determine whether one of them includes an entry indicating that a source name associated with the encoded data slice is effected by the DAP redistribution operation. When a map does include such an entry, the storage unit determines that the encoded data slice is effected by the DAP redistribution operation.

A decision is made at step 116 based on whether the encoded data slice is effect or not. When it is not, the method continues at step 118 where the storage unit executes the data access request. For example, the storage unit reads the encoded data slice based on the DSN address of the slice.

When the encoded data slice is effected by the DAP redistribution operation, the method continues at step 120 where the storage unit determines to execute the access request, proxy the access request, or deny the access request. In an example, the storage unit determines whether it is currently storing the encoded data slice as a result of the DAP redistribution operation. If so, the storage unit determines to execute the access request. In this instance, the method continues at step 118 where the storage unit executes the access request for the encoded data slice.

When the storage unit determines to proxy the access request, the method continues at step 122, where the storage unit sends the access request to a proxy storage unit. In most instances, the proxy storage unit will be the storage unit that is currently storing the encoded data slice during the DAP redistribution operation. For example, the proxy storage unit is the storage unit to which the encoded data slice is being transferred. As another example, the proxy storage unit is the storage unit that is storing the encoded data slice prior to transferring per the DAP redistribution operation.

In a few situations, it may be more favorable to system operations to deny the access request. For example, when the system resources are limited and there are many other access requests pending that don't involve encoded data slices that are effected by the DAP redistribution operation. When this occurs, the method continues at step 124, where the storage unit denies the access request.

FIG. 16B illustrates an example method of maintaining one of the source name based addressing maps. The method includes step 110-1 where the storage unit receives, from another storage unit of the DSN, a redistribution indication for a particular source name that is within the DSN address range of the other storage unit. The method continues at step 110-2 where the storage unit identifies the source name based addressing maps of the other storage unit. The method continues at step 110-3 where the storage unit updates one or more entries in map to reflect that the particular source name is effected by the DAP redistribution operation.

FIG. 16C illustrates another example method of maintaining one of the source name based addressing maps. The method includes step 110-4 where the storage unit receives one or more encoded data slices having DSN addresses that include a source name as a result of a data transfer in accordance with the DAP redistribution operation. The method continues at step 110-5 where the storage unit stores the one or more encoded data slices. The method then continues at step 100-6 where the storage unit updates one or more entries in the map to indicate that the particular source name is no longer effected by the DAP redistribution operation.

FIG. 17 is a logic diagram of another embodiment of a method for performing vault synchronization that is executed by a computing device (e.g., one or more of devices 12-20 of FIG. 1). The method includes step 130 where the computing device sends a slice name listing request to storage units that supports vaults within the DSN. In an example, the slice name listing request is requesting, from each of the storage units, a list of slice names that are associated with encoded data slices being stored by the respective storage units. For instance, the computing device generates the slice name listing request regarding a namespace range in each vault that stores metadata regarding the data objects, wherein the names of the metadata is deterministically generated in a similar manner for each of the vaults.

The method continues at steps 132 and 136. At step 132, the computing device receives a first plurality of list name responses from at least some of the storage units. In an example, the first plurality of list name responses corresponds to slices names of encoded data slices stored in a first vault. The method continues at step 134 where the computing device identifies data objects stored in the first vault based on the first plurality of list name responses. Note that for a data object to be deemed properly stored in a vault, the computing device needs to receive at least a write threshold number of favorable responses for each set of the plurality of sets of encoded data slices of the data object.

At step 136, the computing device receives a second plurality of list name responses from at least another some of the storage units (which may include one or more storage units that also providing a list name response for the first vault). In an example, the second plurality of list name responses corresponds to slices names of encoded data slices stored in a second vault. The method continues at step 138 where the computing device identifies data objects stored in the second vault based on the second plurality of list name responses.

The method continues at step 140 where the computing device identifies, or selects, a data object from one of the vaults. For this data object, the method continues at step 142 where the computing device determines whether the data object is substantially similar in both vaults (i.e., does not have a data object difference). If the object is substantially similarly stored in both vaults, the method repeats at step 140 for another data object.

If, however, there is a data object difference (e.g., the data object is not similarly stored in both vaults), the method continues at step 144 where the computing device determines whether the data object difference is a synchronization issue or a data merging issue. When the data object difference is a synchronization issue (i.e., it is stored in one vault, but not the other), the method continues at step 146 where the computing device synchronizes the data object in the first vault and the second vault (e.g., stores a copy of the data object in the vault that was missing the data object).

As an example of storing a copy, the computing device retrieves the plurality of sets of encoded data slices for the data object from the vault that is currently storing it. The computing device then dispersed storage error decodes the plurality of sets of encoded data slices in accordance with dispersed storage error parameters (e.g., pillar width, decode threshold, read threshold, write threshold, error encoding function, data segmenting, etc.) of the vault to recover the data object.

The computing device then dispersed storage error encodes the recovered data object in accordance with dispersed storage error parameters of the other vault to produce a new plurality of sets of encoded data slices for the data object. The computing device then sends the new plurality of sets of encoded data slices to storage units supporting the other vault.

When the data object difference is the data merging issue (e.g., different versions of the data object are stored by the vaults), the method continues at step 148 where the computing device determines a data preservation policy for resolving the data object difference. In an example, the data preservation policy is a keep the most current version of the data object policy. In another example, the data preservation policy is a multiple version policy (e.g., each vault stores each different version of the data object). The method continues at step 150 where the computing device implements the data preservation policy to resolve the data object difference.

FIG. 18 is a logic diagram of another embodiment of a method for performing vault redundancy reduction that is executed by a computing device (e.g., one or more of devices 12-20 of FIG. 1). The method includes step 160 where the computing device determines to reduce "N" copies of a data object that is stored in "N" vaults to "R" copies of the data object in "R" vaults, where N is an integer greater than or equal to two and where R=N−X, where X is an integer that is less than N. As a specific example, the computing device determines to reduce five copies of a data object stored in five vaults to three copies of the data object stored in three vaults. For this example, N=5, R=3, and X=2. Note that storage units of the DSN support the "N" vaults and the "R" vaults are a sub-set of the "N" vaults.

To determine the N number of vaults, the computing device issues slice name listing requests to the storage units for a particular DSN address range of a plurality of vaults. The computing device then interprets slice name listing responses from at least some of the storage units to determine that the data object is stored in the "N" vaults.

The method continues at step 162 where the computing device calculates "N" scores for the data object based on "N" vault weight values and information relating to the data object (e.g., object ID, a name, a DO weight factor, a user ID, etc.). In an embodiment, the "N" scores are calculated by performing a Weighted Rendezvous Hash on the information in conjunction with a vault weight value for a vault of the "N" vault weight values.

The method continues at step 162 where the computing device selects the "R" vaults from the "N" vaults based on the "N" scores and a score selection function (e.g., the highest scores, lowest scores, etc.). In an example, the computing device determines a number for "R" based on one or more of: vault address space availability, redundancy requirements for the data object, access rate of the data object, and system administration instruction. When selecting the R vaults, the computing device verifies that each of the R vaults includes a valid copy of the data object (e.g., a write threshold number of encoded data slices for each set of the plurality of sets of encoded data slices of the data object).

In another example, the computing device selects the "R" vaults by ranking the "N" scores from highest to lowest and selecting the "R" vaults having the "R" highest scores of the "N" scores. In yet another example, the computing device selects the "R" vaults by ranking the "N" scores from lowest to highest and selecting "R" vaults having the "R" lowest scores of the "N" scores. In a further example, computing device selects the "R" vaults by ranking the "N" scores from highest to lowest, selecting the "R" vaults based on a modulo "X" function, wherein "X" is less than "R". For example, if N=8, R=4, and X=3, then the fourth, the seventh, the second, and the fifth vaults would be selected.

The method continues at step 166 where the computing device sends delete commands to storage units supporting "N−R" vaults of the "N" vaults. A delete command instructs one of the "N−R" vaults to delete its copy of the data object.

The method continues at step 168 where the computing device receives a read request for the data object. The method continues at steps 170 where the computing device identifies the "R" vaults of the "N" vaults based on the "N" vault weight values and the information relating to the data object. The method continues at step 172 where the computing device selects one of the "R" identified vaults to send the read request.

FIGS. 19A-C are schematic block diagrams of another embodiment of vaults within a DSN supported by seven storage units (which could be more or less). In FIG. 19A, five storage units of a set of storage units supports an existing vault and seven storage units of the set supports a new vault. In this example, the existing vault would have its own dispersed storage coding properties and the new vault would include its own dispersed storage coding properties. In an example, the dispersed storage coding properties includes data segment sizing, pillar width number, decode threshold number, read threshold number, write threshold number, an error encoding function, data codecs, slice-level codecs, storage unit types, and/or on memory device encoding.

In FIG. 19B, seven storage units of a set of storage units supports an existing vault and five storage units of the set supports a new vault. In this example, the existing vault would have its own dispersed storage coding properties and the new vault would include its own dispersed storage coding properties.

In FIG. 19C, seven storage units of a set of storage units supports an existing vault and seven storage units of the set supports a new vault. In this example, the existing vault would have its own dispersed storage coding properties and the new vault would include its own dispersed storage coding properties.

In each of FIGS. 19A-19C, the new vault is being created to replace the existing vault (i.e., vault transformation). There are a variety of reasons for vault transformation. For example, the owner of the vault changes its subscription necessitating the change. As another example, a hardware change to one or more storage units would necessitate the change. Note that the existing vault could be in a first set of storage units than the new vault in a second set of storage units. Further note that first and second sets of storage units may have some storage units in common or no storage units in common.

FIG. 20 is a logic diagram of another embodiment of a method for performing vault transformation that is executed by a computing device (e.g., one or more of devices 12-20 of FIG. 1). The method includes step 180 where the computing device identifies a target logical storage vault ("vault") that has existing dispersed storage coding properties for a vault transformation. The dispersed storage coding properties include data segment sizing, pillar width number, decode threshold number, read threshold number, write threshold number, an error encoding function, data codecs, slice-level codecs, storage unit types, and/or on memory device encoding. Note that first data objects of the target vault have a first pillar width number, a first decode threshold number, and a first error encoding function and second data objects of the target vault have a second pillar width number, a second decode threshold number, and a second error encoding function. Further note that the one or more of the pillar width number, the decode threshold number, and the error encoding function may be the same or different for the first and second data objects.

The computing device may identify the target vault in a variety of ways. For example, the computing device receives a message that identifies a specific logical storage vault as the target logical storage vault. As another example, the computing device determines to update or upgrade the target logical storage vault. As yet another example, the computing device determines a storage tier status change for the target logical storage vault. As a specific example, the vault is transitioning from external storage tier to achieve tier.

The method continues at steps 182 and 192. At step 182, the computing device selects a first set of storage units that is supporting the target logical storage vault based on first data objects stored within the first set of storage units. In an example, the computing device determines the first data objects based on source names of the first data objects, wherein, from the source names, the first pillar width number is determinable.

The method continues at step 184 wherein the computing device allocates storage space within storage units of the DSN to support a new logical storage vault having new dispersed storage coding properties. Note that at least some storage units of the first set of storage units are included in the storage units supporting the new logical storage vault.

The method continues at step 186 where the computing device transforms the first data objects from being in accordance with the existing dispersed storage coding properties to being in accordance with the new dispersed storage coding properties to produce transformed first data objects. As an example, the computing device retrieves a plurality of sets of a threshold number of encoded data slices from storage units in the first set of storage units for a first data object. The example continues with the computing device decoding the plurality of sets of a threshold number of encoded data slices in accordance with the existing dispersed storage coding properties to recover the first data object. The example continues with the computing device encoding the recovered one of the first data objects in accordance with the new dispersed storage coding properties to produce a new plurality of sets of encoded data slices.

The method continues at step 188 where the computing device writes the transformed first data objects into the new logical storage vault supported by the storage units. The method continues at step 190 where the computing device, after the transformed first data objects have been stored in the new logical storage vault, re-purposes storage space of the first set of storage units that was storing the first data objects.

At step 192, the computing device selects a second set of storage units that is supporting the target logical storage vault based on the second data objects stored within the second set of storage units. The method continues at step 194 where the computing device transforms the second data objects from being in accordance with the existing dispersed storage coding properties to being in accordance with the new dispersed storage coding properties to produce transformed second data objects. The method continues at step 196 where the computing device writes the transformed second data objects into the new logical storage vault supported by the storage units. The method continues at step 198 where the computing device, after the transformed second data objects have been stored in the new logical storage vault, re-purposes storage space of the second set of storage units that was storing the second data objects. In an example, the computing device re-purposes of the storage space of the first set of storage units by allocating at least a portion of the storage space of the first set of storage units to the new logical storage vault for storing at least some of the transformed second data objects.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a storage network, the method comprises:
    identifying an existing logical storage vault that has existing dispersed storage coding properties for vault transformation, wherein the existing logical storage vault is a portion of a namespace of the storage network, wherein a first set of storage units of the storage network supports the existing logical storage vault, and wherein a data object of first data objects stored within the first set of storage units is stored as a first plurality of sets of encoded data slices in accordance with the existing dispersed storage coding properties;
    identifying a new logical storage vault having new dispersed storage coding properties, wherein storage units of the storage network support the new logical storage vault, and wherein at least one property of the new dispersed storage coding properties is different from a corresponding property of the existing dispersed storage coding properties;
    transforming the first data objects from being in accordance with the existing dispersed storage coding properties to being in accordance with the new dispersed storage coding properties to produce transformed first data objects; and
    storing the transformed first data objects in the new logical storage vault supported by the storage units.

2. The method of claim 1 further comprises:
    after the transformed first data objects have been stored in the new logical storage vault, re-purposing storage space of the first set of storage units that were storing the first data objects.

3. The method of claim 1, wherein the existing dispersed storage coding properties comprises:
    for the first data objects, a first pillar width number, a first decode threshold number, and a first error encoding function; and
    for second data objects, a second pillar width number, a second decode threshold number, and a second error encoding function.

4. The method of claim 3 further comprises:
    selecting a second set of storage units of the storage network supporting the existing logical storage vault based on the second data objects stored within the second set of storage units;
    transforming, by the computing device, the second data objects from being in accordance with the existing dispersed storage coding properties to being in accordance with the new dispersed storage coding properties to produce transformed second data objects; and
    storing the transformed second data objects into the new logical storage vault supported by the storage units.

5. The method of claim 4 further comprises:
    after the transformed second data objects have been stored in the new logical storage vault, re-purposing storage space of the second set of storage units that were storing the second data objects.

6. The method of claim 4 further comprises:
    allocating at least a portion of storage space of the first set of storage units to the new logical storage vault for storing at least some of the transformed second data objects.

7. The method of claim 1, wherein the identifying the existing logical storage vault comprises one or more of:
    receiving a message that identifies a specific logical storage vault as the existing logical storage vault;
    determining to update or upgrade the existing logical storage vault; and
    determining a storage tier status change for the existing logical storage vault.

8. The method of claim 1, wherein the transforming the one of the first data objects comprises:
    retrieving, by the computing device, a plurality of sets of a decode threshold number of encoded data slices from a decode threshold number of storage units of the first set of storage units;
    decoding, by the computing device, the plurality of sets of the decode threshold number of encoded data slices in accordance with the existing dispersed storage coding properties to recover the one of the first data objects; and
    encoding, by the computing device, the recovered one of the first data objects in accordance with the new dispersed storage coding properties to produce a new plurality of sets of encoded data slices.

9. The method of claim 8, wherein the existing dispersed storage coding properties includes a first decode threshold number and the new dispersed storage coding properties includes a second decode threshold number, wherein a first decode threshold number and the second decode threshold number are different numbers.

10. The method of claim 1, wherein the existing dispersed storage coding properties and the new dispersed storage coding properties includes one or more of: a data segment sizing, a pillar width number, a decode threshold number, a read threshold number, a write threshold number, an error encoding function, a data codec, a slice-level codec, and a storage unit type.

11. A computing device of a storage network comprises:
    an interface;
    memory; and
    a processing module operably coupled to the interface and to the memory, wherein the processing module is operable to:
    identify an existing logical storage vault that has existing dispersed storage coding properties for vault transformation, wherein the existing logical storage vault is a portion of a namespace of the storage network, wherein a first set of storage units of the storage network supports the existing logical storage vault, and wherein a data object of first data objects stored within the first set of storage units is stored as a first plurality of sets of encoded data slices in accordance with the existing dispersed storage coding properties;

identify a new logical storage vault having new dispersed storage coding properties, wherein storage units of the storage network support the new logical storage vault, and wherein at least one property of the new dispersed storage coding properties is different from a corresponding property of the existing dispersed storage coding properties;

transform the first data objects from being in accordance with the existing dispersed storage coding properties to being in accordance with the new dispersed storage coding properties to produce transformed first data objects; and store the transformed first data objects in the new logical storage vault supported by the storage units.

12. The computing device of claim 11, wherein the processing module is further operable to:

after the transformed first data objects have been stored in the new logical storage vault, re-purpose storage space of the first set of storage units that were storing the first data objects.

13. The computing device of claim 11, wherein the existing dispersed storage coding properties comprises:

for the first data objects, a first pillar width number, a first decode threshold number, and a first error encoding function; and for second data objects, a second pillar width number, a second decode threshold number, and a second error encoding function.

14. The computing device of claim 13, wherein the processing module is further operable to:

select a second set of storage units of the storage network supporting the existing logical storage vault based on the second data objects stored within the second set of storage units;

transform the second data objects from being in accordance with the existing dispersed storage coding properties to being in accordance with the new dispersed storage coding properties to produce transformed second data objects; and store the transformed second data objects into the new logical storage vault supported by the storage units.

15. The computing device of claim 14, wherein the processing module is further operable to:

after the transformed second data objects have been stored in the new logical storage vault, re-purpose storage space of the second set of storage units that were storing the second data objects.

16. The computing device of claim 14, wherein the processing module is further operable to:

allocate at least a portion of storage space of the first set of storage units to the new logical storage vault for storing at least some of the transformed second data objects.

17. The computing device of claim 11, wherein the processing module is operable to identify the existing logical storage vault by one or more of:

receiving a message that identifies a specific logical storage vault as the existing logical storage vault;

determining to update or upgrade the existing logical storage vault; and determining a storage tier status change for the existing logical storage vault.

18. The computing device of claim 11, wherein the processing module is operable to transform one of the first data objects by:

retrieving a plurality of sets of a decode threshold number of encoded data slices from a threshold number of storage units of the first set of storage units;

decoding the plurality of sets of the decode threshold number of encoded data slices in accordance with the existing dispersed storage coding properties to recover the one of the first data objects; and encoding the recovered one of the first data objects in accordance with the new dispersed storage coding properties to produce a new plurality of sets of encoded data slices.

19. The computing device of claim 18, wherein the existing dispersed storage coding properties includes a first decode threshold number and the new dispersed storage coding properties includes a second decode threshold number, wherein a first decode threshold number and the second decode threshold number are different numbers.

20. The computing device of claim 11, wherein the existing dispersed storage coding properties and the new dispersed storage coding properties includes one or more of: a data segment sizing, a pillar width number, a decode threshold number, a read threshold number, a write threshold number, an error encoding function, a data codec, a slice-level codec, and a storage unit type.

* * * * *